(12) United States Patent
Fukuda et al.

(10) Patent No.: US 11,905,683 B2
(45) Date of Patent: Feb. 20, 2024

(54) WORKING MACHINE

(71) Applicant: KUBOTA CORPORATION, Osaka (JP)

(72) Inventors: Yuji Fukuda, Osaka (JP); Ryosuke Kinugawa, Osaka (JP); Ryota Hamamoto, Osaka (JP); Jun Tomita, Osaka (JP)

(73) Assignee: KUBOTA CORPORATION, Osaka (JP)

(*) Notice: Subject to any disclaimer, the term of this patent is extended or adjusted under 35 U.S.C. 154(b) by 300 days.

(21) Appl. No.: 17/551,687

(22) Filed: Dec. 15, 2021

(65) Prior Publication Data

US 2022/0120057 A1 Apr. 21, 2022

Related U.S. Application Data

(63) Continuation of application No. 16/793,364, filed on Feb. 18, 2020, now Pat. No. 11,236,491.

(30) Foreign Application Priority Data

Feb. 18, 2019 (JP) .................................. 2019-026795
Feb. 18, 2019 (JP) .................................. 2019-026796
(Continued)

(51) Int. Cl.
*E02F 9/22* (2006.01)
*F16H 61/47* (2010.01)

(52) U.S. Cl.
CPC .......... *E02F 9/2253* (2013.01); *E02F 9/2232* (2013.01); *E02F 9/2246* (2013.01);
(Continued)

(58) Field of Classification Search
CPC ..... E02F 9/2246; E02F 9/2253; E02F 9/2289; E02F 9/2292; E02F 9/2296; F16H 61/4008; F16H 61/4017; F16H 61/47
See application file for complete search history.

(56) References Cited

U.S. PATENT DOCUMENTS 3,107,490 A 10/1963 Cooper et al.
4,341,133 A 7/1982 Sakamoto
(Continued)

FOREIGN PATENT DOCUMENTS

JP 2002-145026 5/2002
JP 2007-92955 4/2007
(Continued)

*Primary Examiner* — Michael Leslie
(74) *Attorney, Agent, or Firm* — Greenblum & Bernstein, P.L.C.

(57) ABSTRACT

A working machine includes a prime mover, a traveling pump to be driven by the prime mover to output operation fluid, a traveling motor to be driven by the operation fluid outputted from the traveling pump and to change a motor speed between a first speed and a second speed higher than the first speed, a machine body on which the prime mover, the traveling pump, and the traveling motor are arranged, a traveling switching valve to be switched between a first state allowing the traveling motor to rotate at the first speed and a second state allowing the traveling motor to rotate at the second speed, and a controller to reduce a revolving speed of the prime mover based on a traveling condition of the machine body in switching the traveling switching valve between an accelerating state to switch the traveling switching valve from the first state to the second state and a decelerating state to switch the traveling switching valve from the second state to the first state.

20 Claims, 16 Drawing Sheets

(30) Foreign Application Priority Data

Feb. 18, 2019 (JP) ................................. 2019-026797
Feb. 18, 2019 (JP) ................................. 2019-026798

(52) U.S. Cl.
CPC .......... *E02F 9/2267* (2013.01); *E02F 9/2289* (2013.01); *E02F 9/2292* (2013.01); *F16H 61/47* (2013.01); *E02F 9/2296* (2013.01)

(56) References Cited

U.S. PATENT DOCUMENTS

| | | | |
|---|---|---|---|
| 4,530,416 | A | 7/1985 | Kassai |
| 6,609,368 | B2 | 8/2003 | Dvorak et al. |
| 7,290,390 | B2 | 11/2007 | Kim |
| 8,495,870 | B2 | 7/2013 | Sumiyoshi et al. |
| 9,316,310 | B2 | 4/2016 | Kinugawa et al. |
| 9,347,554 | B2 | 5/2016 | Metzger et al. |
| 10,280,906 | B2 | 5/2019 | Fukuda et al. |
| 10,316,493 | B2 | 6/2019 | Fukuda et al. |
| 10,316,496 | B2 | 6/2019 | Fukuda et al. |
| 10,364,551 | B2 | 7/2019 | Fukuda et al. |
| 10,435,867 | B2 | 10/2019 | Fukuda |
| 10,451,094 | B2 | 10/2019 | Fukuda et al. |
| 10,618,527 | B2 | 4/2020 | Fukuda et al. |
| 10,648,156 | B2 | 5/2020 | Fukuda et al. |
| 10,662,980 | B2 | 5/2020 | Fukuda |
| 10,704,232 | B2 | 7/2020 | Fukuda et al. |
| 10,767,346 | B2 | 9/2020 | Honda et al. |
| 10,771,438 | B2 | 9/2020 | Zuniga et al. |
| 10,920,881 | B2 | 2/2021 | Fukuda et al. |
| 11,236,491 | B2 * | 2/2022 | Fukuda ................. E02F 9/2289 |
| 11,459,731 | B2 * | 10/2022 | Fukuda ................. E02F 3/3414 |
| 11,635,141 | B2 * | 4/2023 | Hamamoto ........... E02F 9/2285 |
| | | | 60/484 |
| 11,788,255 | B2 * | 10/2023 | Fukuda .................. F16H 61/44 |
| | | | 701/50 |
| 11,814,815 | B2 * | 11/2023 | Fukuda ................. E02F 9/2253 |

FOREIGN PATENT DOCUMENTS

| | | |
|---|---|---|
| JP | 2011-188780 | 9/2011 |
| JP | 2017-105434 | 6/2017 |
| JP | 2017179922 A | 10/2017 |
| WO | 2016/051815 | 4/2016 |

\* cited by examiner

FIG.8A

| Actual rev. speed W1 (rpm) | Traveling pilot pressure (MPa) | Reducing amount D1 (rpm) | Lowest prime mover rev. speed W3,W4 (rpm) |
|---|---|---|---|
| 3000 | 2.5 | 1000 | 2000 |
|  | 2.0 | 750 | 2250 |
|  | 1.5 | 500 | 2500 |
|  | 1.0 | 250 | 2750 |
|  | 0.5 | 0 | 3000 |
|  | 0 | 0 | 3000 |
| 2500 | 2.5 | 750 | 1750 |
|  | 2.0 | 563 | 1938 |
|  | 1.5 | 375 | 2125 |
|  | 1.0 | 188 | 2313 |
|  | 0.5 | 0 | 2500 |
|  | 0 | 0 | 2500 |
| 2000 | 2.5 | 500 | 1500 |
|  | 2.0 | 375 | 1625 |
|  | 1.5 | 250 | 1750 |
|  | 1.0 | 125 | 1875 |
|  | 0.5 | 0 | 2000 |
|  | 0 | 0 | 2000 |
| 1500 | 2.5 | 250 | 1250 |
|  | 2.0 | 188 | 1313 |
|  | 1.5 | 125 | 1375 |
|  | 1.0 | 63 | 1438 |
|  | 0.5 | 0 | 1500 |
|  | 0 | 0 | 1500 |
| 1000 | 2.5 | 0 | 1000 |
|  | 2.0 | 0 | 1000 |
|  | 1.5 | 0 | 1000 |
|  | 1.0 | 0 | 1000 |
|  | 0.5 | 0 | 1000 |
|  | 0 | 0 | 1000 |

FIG.9A

| Traveling speed (Vehicle speed) | Traveling pilot pressure (MPa) | Reducing amount D2 (MPa) | Lowest pilot pressure |
|---|---|---|---|
| 10km/h | 2.5 | 1.00 | 1.5 |
| 7.5km/h | 2.0 | 0.75 | 1.25 |
| 5.0km/h | 1.5 | 0.50 | 1 |
| 2.5km/h | 1.0 | 0.25 | 0.75 |
| 0 | 0.5 | 0 | 0.5 |
| 0 | 0 | 0 | 0 |

WORKING MACHINE

CROSS-REFERENCE TO RELATED APPLICATIONS

This application is a Continuation of U.S. patent application Ser. No. 16/793,364 filed Feb. 18, 2020 and claims priority under 35 U.S.C. § 119 to Japanese Patent Application No. P2019-026795, filed Feb. 18, 2019, to Japanese Patent Application No. P2019-026796, filed Feb. 18, 2019, to Japanese Patent Application No. P2019-026797, filed Feb. 18, 2019, and to Japanese Patent Application No. P2019-026798, filed Feb. 18, 2019. The contents of these applications are incorporated herein by reference in their entirety.

BACKGROUND OF THE INVENTION

Field of the Invention

The present invention relates to a working machine.

Description of Related Art

Japanese Unexamined Patent Publication No. 2017-179922 previously discloses a technique for performing the deceleration and the acceleration in a working machine. A hydraulic system for the working machine disclosed in Japanese Unexamined Patent Publication No. 2017-179922 includes a hydraulic pump configured to output operation fluid, a hydraulic switching valve configured to be switched to either one of a plurality of switching positions depending on the pressure of the operation fluid, and a traveling hydraulic device configured to change a speed depending on the switching positions of the hydraulic switching valve.

SUMMARY OF THE INVENTION

A working machine includes: a prime mover; a traveling pump having a swash plate to change a flow rate of outputting of operation fluid in accordance with an angle of the swash plate; a traveling motor to be rotated by the operation fluid outputted by the traveling pump and to change a motor speed between a first speed and a second speed higher than the first speed; a traveling switching valve having: a first state allowing the traveling motor to rotate at the first speed; and a second state allowing the traveling motor to rotate at the second speed; and a controller to decrease the angle of the swash plate in switching the traveling switching valve from the first state to the second state.

A working machine includes: a prime mover; a traveling pump having a swash plate to change a flow rate of outputting of operation fluid in accordance with an angle of the swash plate; a traveling motor to be rotated by the operation fluid outputted by the traveling pump and to change a motor speed between a first speed and a second speed higher than the first speed; a traveling switching valve having: a first state allowing the traveling motor to rotate at the first speed; and a second state allowing the traveling motor to rotate at the second speed; and a controller to decrease the angle of the swash plate in switching the traveling switching valve from the first state to the second state.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8A is a view illustrating a table representing a relation between an actual revolving speed W1 of the prime mover, a traveling pilot pressure, and a decreasing amount $\Delta D1$ of a prime-mover revolving speed according to the second embodiment;

FIG. 9A is a view illustrating a table representing a relation between the traveling pilot pressure and a decreasing amount (a decreasing amount $\Delta D2$) of the traveling pilot pressure according to the second embodiment;

DESCRIPTION OF THE EMBODIMENTS

Figure 1:
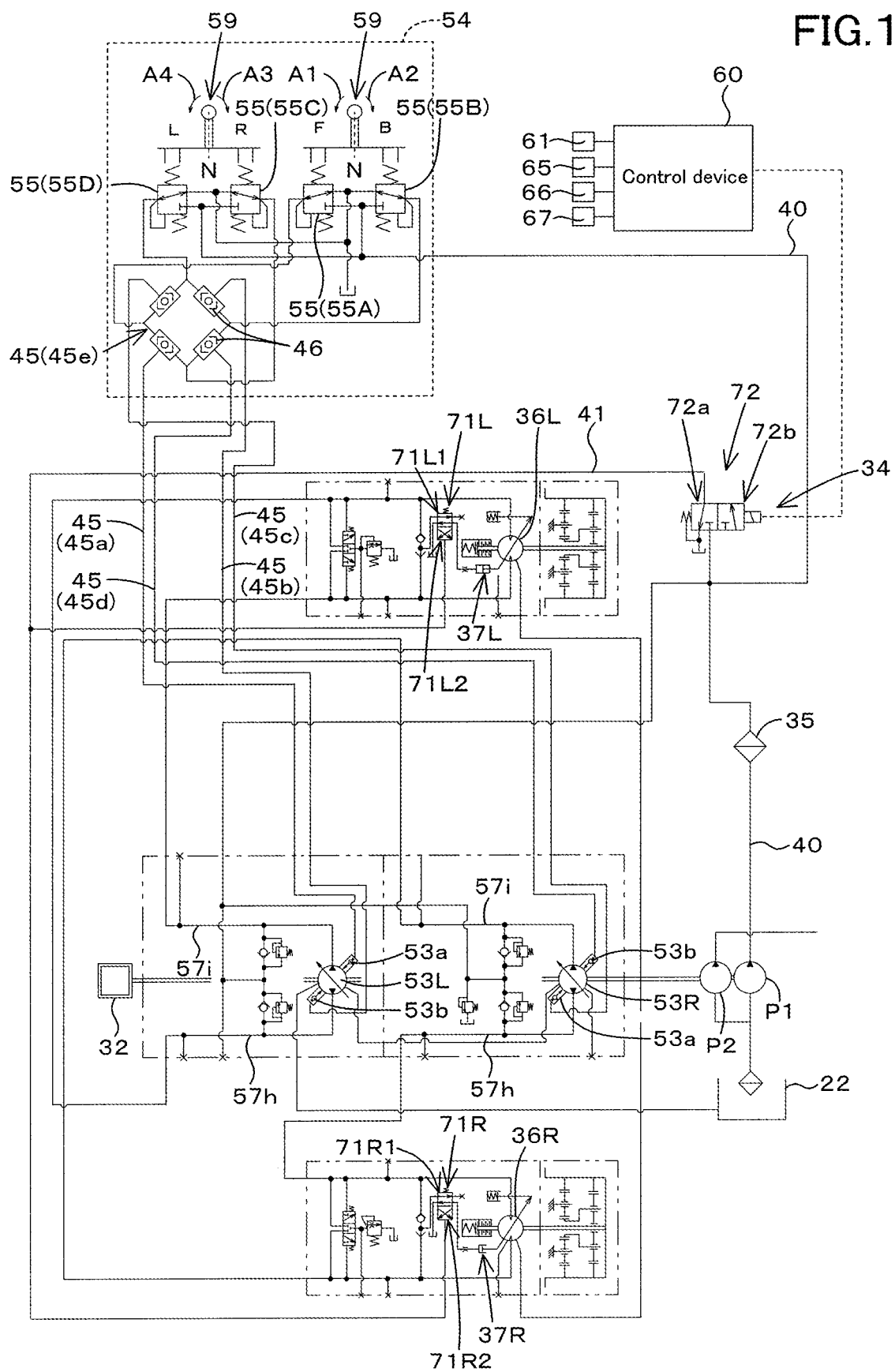
FIG. 1 is a view illustrating a hydraulic system (a hydraulic circuit) for a working machine according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of a hydraulic system for a working machine and a working machine provided with the hydraulic system according to the invention will be described below with reference to the drawings as appropriate.

First Embodiment

Figure 10:
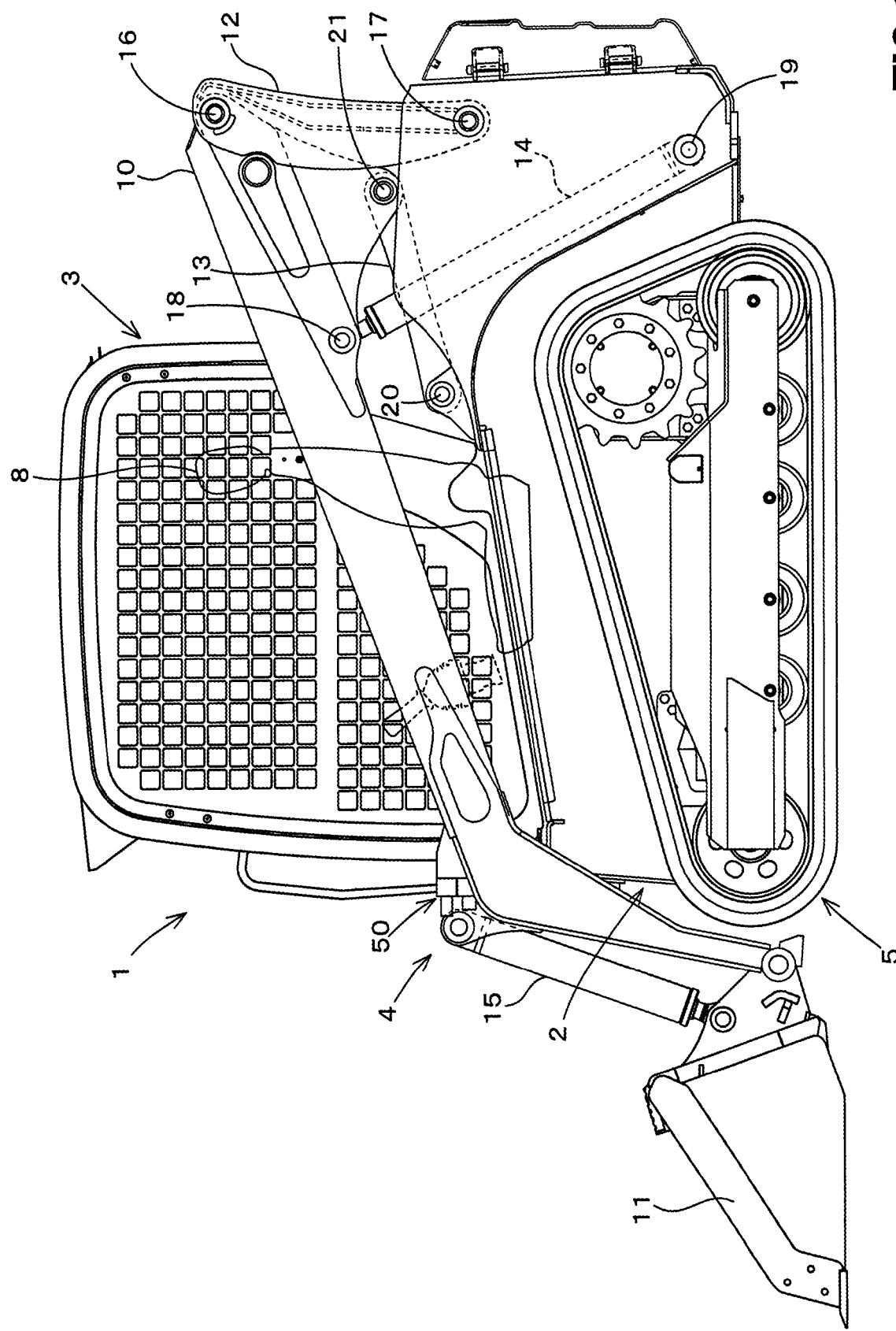
FIG. 10 is a side view of a track loader that is an example of the working machine according to the embodiments.

FIG. 10 shows a side view of a working machine according to embodiments of the present invention. FIG. 10 shows a compact truck loader as an example of the working machine. However, the working machine according to the embodiments of the present invention is not limited to the compact truck loader, and may be another type of loader working machine such as a skid steer loader. In addition, the working machine other than the loader working machine may be employed.

As shown in FIG. 10, the working machine 1 includes a machine body 2, a cabin 3, a working device 4, and a traveling device 5. In the embodiment of the present invention, the front side of an operator seated on the operator seat 8 of the working machine 1 (the left side in FIG. 10) is referred to as the front, the rear side of the operator (the right side in FIG. 10) is referred to as the rear, the left side of the operator (a front surface side of FIG. 10) is referred to as the left, and the right side of the operator (a back surface side of FIG. 10) is referred to as the right.

In addition, the horizontal direction, which is a direction orthogonal to the front-rear direction, will be described as the machine width direction. The direction extending from the center portion of the machine body 2 toward the right portion or the left portion will be described as the machine outward direction. In other words, the machine outward direction is the machine width direction, that is, a direction separating away from the machine body 2.

The direction opposite to the machine outward direction will be described as the machine inward direction. In other words, the machine inward direction is the machine width direction, that is, a direction approaching the machine body 2.

The cabin 3 is mounted on the machine body 2. The cabin 3 is provided with the operator seat 8. The working device 4 is attached to the machine body 2. The traveling device 5 is provided outside the machine body 2. A prime mover 32 is mounted at the rear portion of the machine body 2.

The working device 4 includes a boom 10, a working tool 11, a lift link 12, a control link 13, a boom cylinder 14, and a bucket cylinder 15.

The booms 10 are provided respectively to the right side and the left side of the cabin 3 so as to be swingable up and down. The working tool 11 is, for example, a bucket. The bucket 11 is provided at the tip portion (a front end portion) of the boom 10 so as to be swingable up and down.

The lift link 12 and the control link 13 support the base portion (the rear portion) of the boom 10 so that the boom 10 can swing up and down. The boom cylinder 14 is stretched and shortened to lift and lower the boom 10. The bucket cylinder 15 is stretched and shortened to swing the bucket 11.

The front portions of the boom 10 arranged to the right and the boom 10 arranged to the left are connected to each other by a deformed connection pipe. The base portions (the rear portions) of the booms 10 are connected to each other by a cylindrical connection pipe.

The lift link 12, the control link 13, and the boom cylinder 14 are provided respectively to the left side and to the right side of the machine body 2 corresponding to the boom 10 arranged to the right and to the boom 10 arranged to the left.

The lift link 12 is arranged in the longitudinal direction at the rear portion of the base portion of each of the booms 10. The upper portion (one end side) of the lift link 12 is pivotally supported around the horizontal axis by a pivot shaft 16 (a first pivot shaft) near the rear portions of the base portions of the booms 10.

In addition, the lower portion (the other end side) of the lift link 12 is pivotally supported around the horizontal axis by a pivot shaft 17 (a second pivot shaft) near the rear portion of the machine body 2. The second pivot shaft 17 is arranged below the first pivot shaft 16.

The upper portion of the boom cylinder 14 is pivotally supported by a pivot shaft 18 (a third pivot shaft) so as to be rotatable about the horizontal axis. The third pivot shaft 18 is arranged on the base portion of each of the booms 10, that is, arranged on front portion of the base portion.

The lower portion of the boom cylinder 14 is pivotally supported by a pivot shaft 19 (a fourth pivot shaft) so as to be rotatable about the horizontal axis. The fourth pivot shaft 19 is arranged near the lower portion of the rear portion of the machine body 2 below the third pivot shaft 18.

The control link 13 is arranged in front of the lift link 12. One end of the control link 13 is pivotally supported about the horizontal axis by a pivot shaft 20 (a fifth pivot shaft). The fifth pivot shaft 20 is arranged on the machine body 2, that is, on a position corresponding to the front of the lift link 12.

The other end of the control link 13 is pivotally supported about a horizontal axis by a pivot shaft 21 (a sixth pivot shaft). The sixth pivot shaft 21 is arranged on the boom 10, that is, arranged above the second pivot shaft 17 in front of the second pivot shaft 17.

When the boom cylinder 14 is stretched and shortened, the booms 10 swing up and down around the first pivot shaft 16 while the base portions of the booms 10 are supported by the lift link 12 and the control link 13, and thus the distal end portions of the booms 10 are lifted and lowered.

The control link 13 swings up and down around the fifth pivot shaft 20 in synchronization with the upward swinging and downward singing of the booms 10. The lift link 12 swings back and forth around the second pivot shaft 17 in synchronization with the upward swinging and downward singing of the control links 13.

Instead of the bucket 11, another working tool can be attached to the front portion of the boom 10. The other working tool is an attachment (an auxiliary attachment) such as a hydraulic crusher, a hydraulic breaker, an angle broom, an earth auger, a pallet fork, a sweeper, a mower, and a snow blower.

A connecting member 50 is provided at the front portion of the boom 10 arranged to the left. The connection member 50 is a device that connects the hydraulic device equipped in the auxiliary attachment to the first piping material such as a pipe provided in the boom 10.

In particular, the first pipe member can be connected to one end of the connecting member 50, and the second pipe member connected to the hydraulic device of the auxiliary attachment can be connected to the other end. In this manner, the operation fluid flowing through the first piping material flows through the second piping material, and then is supplied to the hydraulic device.

The bucket cylinder 15 is arranged near the front portion of each of the booms 10. The stretching and shortening of the bucket cylinder 15 swing the bucket 11.

The traveling device 5 arranged to the right and the traveling device 5 arranged to the left (a first traveling device, a second traveling device) are crawler type (including semi-crawler type) traveling devices in this embodiment. In addition, a wheel type traveling device which has a front wheel and a rear wheel may be employed as the traveling device 5.

The prime mover 32 is an internal combustion engine such as a diesel engine or a gasoline engine, an electric motor, or the like. In this embodiment, the prime mover 32 is a diesel engine, but is not limited to the diesel engine.

Next, the hydraulic system for the working machine will be described below.

As shown in FIG. 1, the hydraulic system for the working machine is configured to drive the traveling device 5. The hydraulic system for the working machine includes a first traveling pump 53L, a second traveling pump 53R, a first traveling motor 36L, and a second traveling motor 36R.

The first traveling pump 53L and the second traveling pump 53R are pumps configured to be driven by the power of the prime mover 32. In particular, the first traveling pump 53L and the second traveling pump 53R are the variable displacement axial pumps of swash plate type that is driven by the power of the prime mover 32.

The first traveling pump 53L and the second traveling pump 53R have a forward pressure receiving portion 53a to which a pilot pressure is applied and a reverse pressure receiving portion 53b to which a pilot pressure is applied. The angle of swash plate is changed by the pilot pressure acting on the pressure receiving portions 53a and 53b.

By changing the angle of the swash plate, the outputs of the first traveling pump 53L and the second traveling pump 53R (an output rate of the operation fluid) and the output direction of the operation fluid can be changed.

The first traveling pump 53L and the first traveling motor 36L are connected by a circulating fluid tube 57h, and thus the operation fluid outputted from the first traveling pump 53L is supplied to the first traveling motor 36L. The second traveling pump 53R and the second traveling motor 36R are connected by a circulating fluid tube 57i, and the operation fluid outputted from the second traveling pump 53R is supplied to the second traveling motor 36R.

The first traveling motor 36L is a motor that transmits power to the drive shaft of the traveling device 5 arranged to the left side of the machine body 2. The first traveling motor 36L can be rotated by the operation fluid outputted from the first traveling pump 53L, and is configured to change the rotating speed (the number of rotating) depending on the flow rate of the operation fluid.

A swash-plate switching cylinder 37L is connected to the first traveling motor 36L, and the rotating speed (the number of rotating) of the first traveling motor 36L can be also changed by stretching and shortening the swash-plate switching cylinder 37L to one side or the other side.

That is, when the swash-plate switching cylinder 37L is shortened, the rotating speed of the first traveling motor 36L is set to a low speed (a first speed). When the swash-plate switching cylinder 37L is stretched, the rotating speed of the first traveling motor 36L is set to a high speed (a second speed). That is, the rotating speed of the first traveling motor 36L can be changed between the first speed on the low speed side and the second speed on the high speed side.

The second traveling motor 36R is a motor configured to transmit power to the drive shaft of the traveling device 5 arranged on the right side of the machine body 2. The second traveling motor 36R can be rotated by the operation fluid outputted from the second traveling pump 53R, and is configured to change the rotating speed (the number of rotating) depending on the flow rate of the operation fluid.

A swash-plate switching cylinder 37R is connected to the second traveling motor 36R, and the rotating speed (the number of rotating) of the second traveling motor 36R is also changed by stretching and shortening the swash-plate switching cylinder 37R to one side or the other side.

That is, when the swash-plate switching cylinder 37R is shortened, the rotating speed of the second traveling motor 36R is set to a low speed (a first speed), and when the swash-plate switching cylinder 37R is stretched, the second traveling motor 36R is set to a high speed (a second speed). That is, the rotating speed of the second traveling motor 36R can be changed between the first speed on the low speed side and the second speed on the high speed side.

As shown in FIG. 1, the hydraulic system for the working machine includes a traveling switching valve 34. The traveling switching valve 34 is configured to be switched between a first state in which the rotating speed (the number of rotating) of the traveling motor (the first traveling motor 36L and the second traveling motor 36R) is set to the first speed and a second state in which the rotating speed is set to the second speed. The traveling switching valve 34 includes the first switching valves 71L and 71R and the second switching valve 72.

The first switching valve 71L is a two-position switching valve that is connected to the swash-plate switching cylinder 37L of the first traveling motor 36L through an fluid tube and is configured to be switched between the first position 71L1 and the second position 71L2. The first switching valve 71L shortens the swash-plate switching cylinder 37L when being in the first position 71L1, and stretches the swash-plate switching cylinder 37L when being in the second position 71L2.

The second switching valve 71R is a two-position switching valve that is connected to the swash-plate switching cylinder 37R of the second traveling motor 36R through an fluid tube and is configured to be switched between the first position 71R1 and the second position 71R2. The second switching valve 71R shortens the swash-plate switching cylinder 37R when being in the first position 71R1, and stretches the swash-plate switching cylinder 37R when being in the second position 71R2.

The second switching valve 72 is an electromagnetic valve configured to switch the first switching valve 71L and the second switching valve 71R, that is, a two-position switching valve configured to be magnetized to switch the first switching valve 71L and the second switching valve 71R switched between the first position 72a and the second position 72b. The second switching valve 72, the first switching valve 71L, and the second switching valve 71R are connected by an fluid tube 41.

The second switching valve 72 switches the first switching valve 71L and the second switching valve 71R to the first positions 71L1 and 71R1 when being in the first position 72a, and switches the first switching valve 71L and the second switching valve 71R to the second positions 71L2 and 71R2 when being in the second position 72b.

That is, when the second switching valve 72 is in the first position 72a, the first switching valve 71L is in the first position 71L1, and the first switching valve 71R is in the first position 71R1, the traveling switching valve 34 turns into the first state, and thus the rotating speeds of the traveling motors (the first traveling motor 36L and the second traveling motor 36R) are set to the first speed.

When the second switching valve 72 is in the second position 72b, the first switching valve 71L is in the second position 71L2, and the second switching valve 71R is in the second position 71R2, the traveling switching valve 34 is in the second state, and thus the rotating speeds of the traveling motors (the first traveling motor 36L and the second traveling motor 36R) are set to the second speed.

Thus, the traveling switching valve 34 can switch the traveling motors (the first traveling motor 36L and the second traveling motor 36R) between the first speed on the low speed side and the second speed on the high speed side.

The switching between the first speed and the second speed in the traveling motor can be performed by the switching portion. The switching portion is, for example, a changeover switch 61 connected to the controller device (controller) 60, and can be operated by the operator or the like.

The switching portion (the changeover switch 61) switches between an accelerating state and a decelerating state. The accelerating state allows the traveling motor to be switched from the first speed (a first state) to the second speed (a second speed). The decelerating state allows the traveling motor to be switched from the second speed (a second state) to the first speed (a first speed).

The controller device 60 is constituted of a semiconductor such as a CPU or MPU, an electric/electronic circuit, or the like. The controller device 60 switches the traveling switching valve 34 based on the switching operation of the changeover switch 61. The changeover switch 61 is a push switch. For example, when the changeover switch 61 is pressed under the state where the traveling motor in the first speed, the changeover switch 61 outputs, to the controller device 60, a command for setting the traveling motor to the second speed (a command for setting the traveling switching valve 34 to be in the second state).

In addition, when the changeover switch 61 is pressed under the state where the traveling motor in the second speed, the changeover switch 61 outputs, to the controller device 60, a command for setting the traveling motor to the first speed (a command for setting the traveling switching valve 34 to be in the first state).

The change-over switch 61 may be a push switch that is configured to be held ON or OFF. When the switch 61 is OFF, a command for holding the traveling motor at the first speed is outputted to the controller device 60, and when the switch 61 is ON, a command for holding the traveling motor at the second speed is outputted to the controller device 60.

When the controller device 60 obtains the command for setting the traveling switching valve 34 to the first state, the controller device 60 demagnetizes the solenoid of the second switching valve 72 to set the traveling switching valve 34 into the first state. In addition, when the controller device 60 obtains the command for setting the traveling switching valve 34 to the second state, the controller device 60 magnetizes the solenoid of the second switching valve 72 to set the traveling switching valve 34 into the second state.

The hydraulic system for the working machine includes the first hydraulic pump P1, the second hydraulic pump P2, and the operating device 54. The first hydraulic pump P1 is a pump configured to be driven by the power of the prime mover 32, and is constituted of a fixed displacement gear pump. The first hydraulic pump P1 is configured to output the operation fluid stored in the tank 22. In particular, the first hydraulic pump P1 outputs the operation fluid mainly used for the controlling.

For convenience of the explanation, the tank 22 to store the operation fluid may be referred to as an operation fluid tank. Of the operation fluid outputted from the first hydraulic pump P1, the operation fluid used for the controlling may be referred to as a pilot fluid, and a pressure of the pilot fluid may be referred to as a pilot pressure.

The second hydraulic pump P2 is a pump configured to be driven by the power of the prime mover 32, and is constituted of a fixed displacement type gear pump. The second hydraulic pump P2 is configured to output the operation fluid stored in the tank 22, and supplies the operation fluid to a fluid tube for the working system, for example.

For example, the second hydraulic pump P2 supplies the operation fluid to the boom cylinder 14 configured to operate the boom 10, the bucket cylinder 15 to operate the bucket, and the control valve (a flow rate control valve) configured to control the auxiliary hydraulic actuator that operates the auxiliary hydraulic actuator.

The operating device 54 is a device configured to operate the traveling pumps (the first traveling pump 53L and the second traveling pump 53R), and can change the angle of the swash plate (the swash plate angle) of the traveling pump. The operation device 54 includes an operation lever 59 and a plurality of operation valves 55.

The operation lever 59 is an operation lever supported by the operation valve 55 and configured to swing in the left-right direction (in the machine width direction) or in the front-rear direction. That is, the operation lever 59 is configured to be operated to the right and left from the neutral position N, and to be operated forward and rearward from the neutral position N with respect to the neutral position N. In other words, the operation lever 59 can swing in at least four directions with respect to the neutral position N.

For convenience of the explanation, a bidirectional defined by the forward and backward directions, that is, the front-rear direction may be referred to as the first direction. In addition, a bidirectional defined by the rightward and leftward directions, that is, the left-right direction (the machine width direction) may be referred to as the second direction.

The plurality of operation valves 55 are operated in common, that is, operated by one operation lever 59. The plurality of operation valves 55 operate based on the swinging of the operation lever 59. The output fluid tube 40 is connected to the plurality of operation valves 55, and the operation fluid (the pilot fluid) from the first hydraulic pump P1 can be supplied through the output fluid tube 40. The plurality of operation valves 55 include the operation valve 55A, the operation valve 55B, the operation valve 55C, and the operation valve 55D.

The operation valve 55A changes a pressure of the operation fluid to be outputted in accordance with the operation amount (the operating) of the forward operation when the operation lever 59 is swung forward (in one direction) in the front-rear direction (in the first direction). The operation valve 55B changes a pressure of the operation fluid to be outputted in accordance with the operation amount (the operating) of the backward operation when the operation lever 59 is swung backward (in the other direction) in the front-rear direction (in the first direction).

The operation valve 55C changes a pressure of the operation fluid to be outputted in accordance with the operation amount (the operating) of the rightward operation when the operation lever 59 is swung rightward (in one direction) in the left-right direction (in the second direction).

The operation valve 55D changes a pressure of the operation fluid to be outputted in accordance with the operation amount (the operating) of the leftward operation when the operation lever 59 is swung leftward (in the other direction) in the left-right direction (in the second direction).

The plurality of operation valves 55 and the traveling pumps (the first traveling pump 53L and the second traveling pump 53R) are connected by the traveling fluid tube 45. In other words, the traveling pumps (the first traveling pump 53L and the second traveling pump 53R) are hydraulic devices configured to be actuated by the operation fluid outputted from the operation valves 55 (the operation valve 55A, the operation valve 55B, the operation valve 55C, and the operation valve 55D).

The traveling fluid tube 45 includes the first traveling fluid tube 45a, the second traveling fluid tube 45b, the third traveling fluid tube 45c, the fourth traveling fluid tube 45d, and the fifth traveling fluid tube 45e. The first traveling fluid tube 45a is a fluid tube connected to the forward pressure receiving portion 53a of the traveling pump 53L. The second traveling fluid tube 45b is a fluid tube connected to the reverse pressure receiving portion 53b for the traveling pump 53L.

The third traveling fluid tube 45c is a fluid tube connected to the forward pressure receiving portion 53a of the traveling pump 53R. The fourth traveling fluid tube 45d is a fluid tube connected to the reverse pressure receiving portion 53b of the traveling pump 53R. The fifth traveling fluid tube 45e is a fluid tube connecting between the operation valve 55, the first traveling fluid tube 45a, the second traveling fluid tube 45b, the third traveling fluid tube 45c, and the fourth traveling fluid tube 45d.

When the operation lever 59 is swung forward (in the direction indicated by an arrowed line A1 in FIG. 1), the operation valve 55A is operated and the pilot pressure is outputted from the operation valve 55A. The pilot pressure is applied to the pressure receiving portion 53a of the first traveling pump 53L through the first traveling fluid tube 45a and is applied to the pressure receiving portion 53a of the second traveling pump 53R through the third traveling fluid tube 45c.

In this manner, the swash plate angles of the first traveling pump 53L and the second traveling pump 53R are changed, and thus the first traveling motor 36L and the second traveling motor 36R rotate in a normal direction (rotate forward), and the working device 1 travels straight forward.

In addition, when the operation lever 59 is swung backward (in the direction indicated by an arrowed line A2 in FIG. 1), the operation valve 55B is operated, and the pilot pressure is outputted from the operation valve 55B. The pilot pressure is applied to the pressure receiving portion 53b of the first traveling pump 53L through the second traveling fluid tube 45b and also is applied to the pressure receiving portion 53b of the second traveling pump 53R through the fourth traveling fluid tube 45d.

In this manner, the swash plate angles of the first traveling pump 53L and the second traveling pump 53R are changed, the first traveling motor 36L and the second traveling motor 36R are rotated in the reverse direction (rotates backward), and the working device 1 travels straight backward.

In addition, when the operation lever 59 is swung to the right (in the direction indicated by an arrowed line A3 in FIG. 1), the operation valve 55C is operated, and the pilot pressure is output from the operation valve 55C. The pilot pressure is applied to the pressure receiving portion 53a of the first traveling pump 53L through the first traveling fluid tube 45a and also is applied to the pressure receiving portion 53b of the second traveling pump 53R through the fourth traveling fluid tube 45d.

In this manner, the swash plate angles of the first traveling pump 53L and the second traveling pump 53R are changed, the first traveling motor 36L rotates forward, the second traveling motor 36R rotates rearward, and thus the working device 1 turns to the right.

In addition, when the operation lever 59 is swung to the left (in the direction indicated by an arrowed line A4 in FIG. 1), the operation valve 55D is operated, and the pilot pressure is outputted from the operation valve 55D. This pilot pressure is applied to the pressure receiving portion 53a of the second traveling pump 53R through the third traveling fluid tube 45c and also is applied to the pressure receiving portion 53b of the first traveling pump 53L through the second traveling fluid tube 45b.

In this manner, the swash plate angles of the first traveling pump 53L and the second traveling pump 53R are changed, the first traveling motor 36L is reversely rotated, the second traveling motor 36R is rotated forward, and thus the working device 1 turns to the left.

In addition, when the operation lever 59 is swung obliquely, the rotation directions and the rotating speeds of the first traveling motor 36L and the second traveling motor 36R are defined by the differential pressure between the pilot pressures applied to the pressure receiving portion 53a and to the pressure receiving portion 53b. Thus, the working device 1 turns right or turns left while traveling forward or backward.

That is, when the operation lever 59 is swung obliquely to the left and forward, the working device 1 turns left while traveling forward at a speed corresponding to the swing angle of the operation lever 59. When the operation lever 59 is swung obliquely to the right and forward, the working device 1 turns right while traveling forward at a speed corresponding to the swing angle of the operation lever 59. When the operation lever 59 is swung obliquely to the left and backward, the working device 1 turns left while traveling backward at a speed corresponding to the swing angle of the operation lever 59. When the operation lever 59 is swung obliquely to the right and backward, the working device 1 turns right while traveling backward at a speed corresponding to the swing angle of the operation lever 59.

The controller device 60 is connected with an accelerator 65 for setting the revolving speed of the prime mover. The accelerator 65 is provided in the vicinity of the operator seat 8. The accelerator 65 is an accelerator lever that is supported in a swingable manner, an accelerator pedal that is supported in a swingable manner, an accelerator volume that is supported in a rotatable manner, an accelerator slider that is supported in a slidable manner, or the like.

The accelerator 65 is not limited to the above-described example. The controller device 60 is connected to a rotation detector device 66 configured to detect the rotating speed of the prime mover. With the rotation detector device 66, the controller device 60 can know the actual revolving speed (actual rotating speed) of the prime mover 32.

The controller device 60 sets a target revolving speed (a target rotating speed) of the prime mover 32 based on the operation amount of the accelerator 65, and controls the actual revolving speed so as to be the target rotating speed preliminarily set.

In switching the traveling switching valve 34 from the first state (the first speed) to the second state (the second speed), that is, in accelerating the rotating speed of the traveling motor from the first speed to the second speed, the controller device 60 decreases the revolving speed of the prime mover.

The controller device 60 decreases the revolving speed of the prime mover based on the traveling condition of the working machine (the machine body 2). For example, the controller device 60 decreases the revolving speed of the prime mover in the accelerating when the working machine (the machine body 2) is traveling under the traveling state, and does not decrease the revolving speed of the prime mover when the working machine (the machine body 2) is stopping under the traveling state.

Figure 2A:
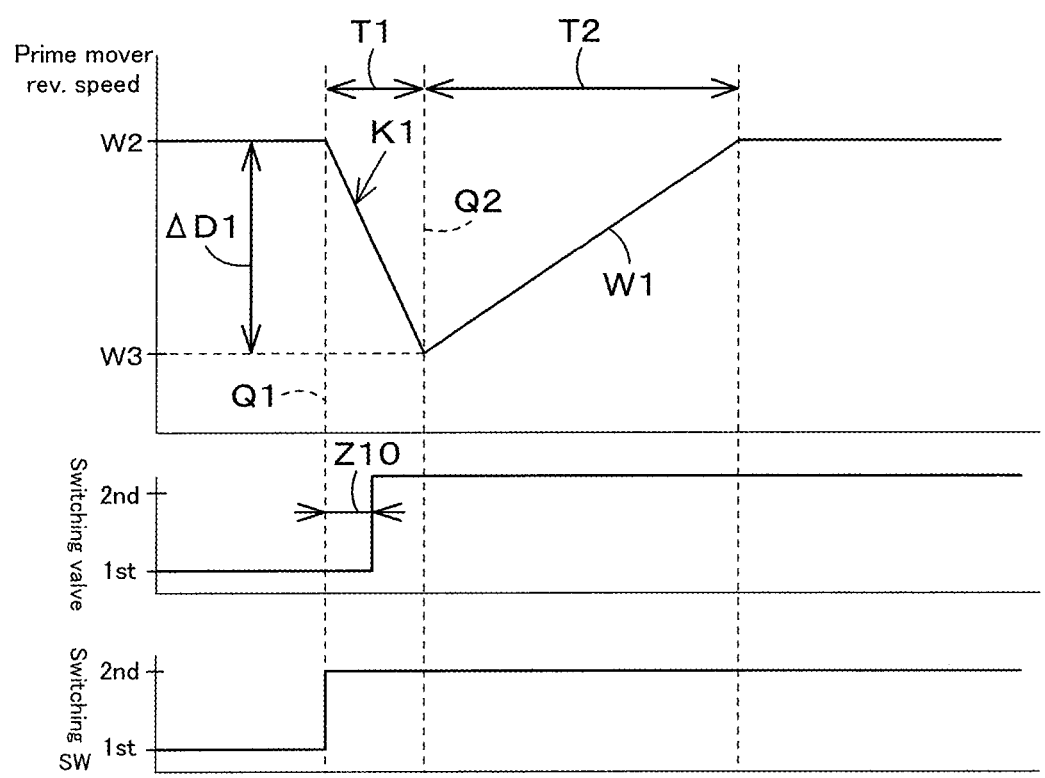
FIG. 2A is a view illustrating a relation between a revolving speed of a prime mover and the switching of a traveling motor under the state where the traveling motor is accelerated according to the first embodiment.

FIG. 2A is a view showing the relation between the switching of the traveling motor and the revolving speed of the prime mover (the target revolving speed and the actual revolving speed) in accelerating the traveling motor from the first speed to the second speed.

As shown in FIG. 2A, the changeover switch (the switch SW) 61 is operated at the time point Q1, and the controller device 60 receives the accelerating command (a second-speed command) for switching from the first state (the first speed) to the second state (the second speed).

When the second speed command is received, the controller device 60 decreases the actual rotating speed W1 to a predetermined rotating speed W3 that is lower than the target rotating speed W2 set by the accelerator 65. The predetermined rotating speed W3 is a rotating speed at which a shift shock is reduced when switching from the first speed to the second speed, and is, for example, a value obtained by subtracting the decrease amount ΔD1 from the actual rotating speed W1.

The controller device 60 sets the decrease amount ΔD1 according to the traveling speed of the working machine (the machine body 2) which is one of the traveling states. In particular, a traveling detector device 67 configured to detect a traveling speed as the traveling state is connected to the controller device 60.

For example, the traveling detector device 67 is a device configured to detect the pressure (the pilot pressure) of the operation fluid (the pilot fluid) outputted from the operation valves 55 (the operation valve 55A, the operation valve 55B, the operation valve 55C, and the operation valve 55D) and then to convert the detected pilot pressure into the traveling speed. For example, when the pilot pressure in the traveling fluid tube 45 is high, the traveling speed is detected to be high, and when the pilot pressure is low, the traveling speed is detected to be low.

The traveling detector device 67 detects the traveling speed based on the pilot pressure in the traveling fluid tube 45. Instead, the traveling detector device 67 may be a device configured to detect the rotating speed of the rotating shaft of the traveling motor and then to convert the detected rotating speed into the traveling speed. The traveling detector device 67 may be constituted of any device as long as the traveling speed can be detected.

That is, when switching to the accelerating state, the controller device 60 sets the decrease amount ΔD1 corresponding to the traveling speed detected by the traveling detector device 67, and decreases the revolving speed of the prime mover corresponding to the set decrease amount ΔD1.

Figure 8B:
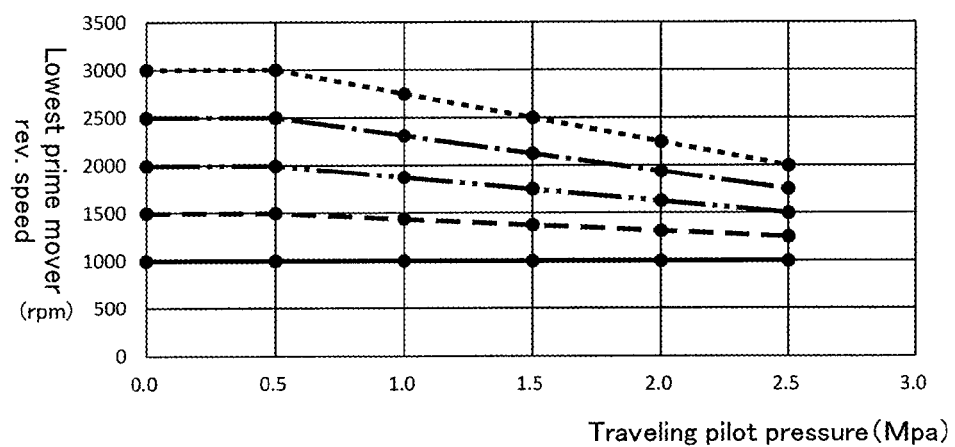
FIG. 8B is a view illustrating a graph of FIG. 8A.

As shown in FIG. 8A, the controller device 60 stores the decrease amount calculation data that indicates the relation between the actual rotating speed W1, the pilot pressure (the traveling pilot pressure) of the traveling fluid tube 45, and the decrease amount ΔD1. FIG. 8B is a graph of FIG. 8A. FIG. 8A and FIG. 8B show an example of the decrease amount calculation data, and is not limited thereto.

For example, as shown in FIG. 8A, when receiving the second speed command, the controller device 60 sets the decrease amount ΔD1 to 500 rpm under the condition where the actual rotating speed W1 is 3000 rpm and the traveling pilot pressure is 1.5 MPa. As shown in FIG. 8A, when decreasing the revolving speed of the prime mover, the controller device 60 sets the lower limit value of the revolving speed of the prime mover so that the revolving speed does not become smaller than the minimum revolving speed of the prime mover.

In addition, before the revolving speed of the prime mover is decreased, the controller device 60 constantly keeps the slope K1 that decreases the revolving speed of the prime mover (the slope of the decrease time T1) even when the decrease amount ΔD1 is different.

When actual rotating speed W1 reaches the predetermined rotating speed W3 at time point Q2, the controller device 60 recovers the actual rotating speed W1 to the target rotating speed W2. Alternatively, the controller device 60 recovers the actual rotating speed W1 to the target rotating speed W2 during the decrease time T1 for which the actual rotating speed W1 is decreased to the predetermined rotating speed W3.

Here, the controller device 60 makes the recover time T2 for recovering the actual angle W1 from the predetermined revolving speed W3 to the target revolving speed W2 longer than the decrease time T1. That is, the controller device 60 makes the decrease speed for decreasing the actual revolving speed W1 to the predetermined revolving speed W3 higher than the recover speed for recovering the actual revolving speed W1 from the predetermined revolving speed W3 to the target revolving speed W2.

In addition, the controller device 60 outputs a signal for magnetizing the solenoid of the traveling switching valve 34 at least for the decrease time T1, that is, before starting the control for recovering the actual revolving speed W1 from the predetermined revolving speed W3 to the target revolving speed W2, and thereby the controller device 60 switches the traveling switching valve 34 from the first state (the first speed) to the second state (the second speed).

In other words, the controller device 60 recovers the actual revolving speed W1 to the target revolving speed W2 after switching the traveling switching valve 34 to the second state.

Figure 3A:
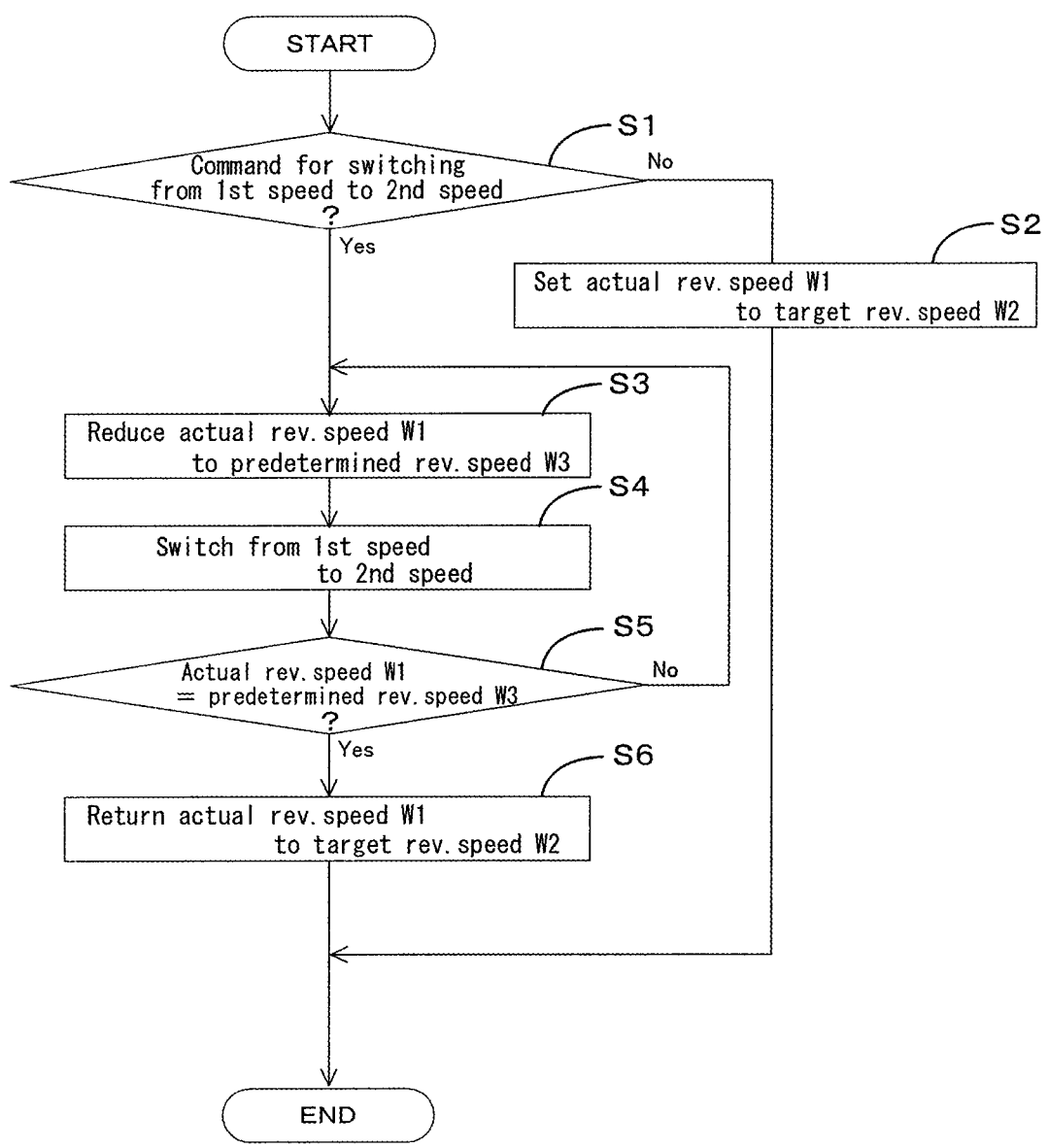
FIG. 3A is a view illustrating a first operation flow of a controller device under the state where the traveling motor is accelerated according to the first embodiment.

FIG. 3A is a view illustrating a control flow of the controller device 60 under the condition where the rotating speed of the traveling motor is changed from the second speed to the first speed according to the first embodiment. Note that the working machine is not under the stopping state but under the traveling state.

The controller device 60 determines whether or not the changeover switch 61 has been switched from the first speed to the second speed (S1).

When the changeover switch 61 is not switched to the second speed, that is, when the changeover switch 61 is maintained at the first speed (S1, No), the controller device 60 sets the actual rotating speed W1 to the target rotation based on the operation of the accelerator 65. The number W2 is set (S2).

When the changeover switch 61 is switched from the first speed to the second speed (S1, Yes), the controller device 60 decreases the actual rotating speed W1 toward a predetermined rotating speed W3 lower than the target rotating speed W2 (S3).

Before the actual rotating speed W1 reaches the predetermined rotating speed W3, the controller device 60 switches the traveling switching valve 34 from the first state (first speed) to the second state (second speed) (S4).

The controller device 60 determines whether or not the actual rotating speed W1 has reached the predetermined rotating speed W3 (S5). When the actual rotating speed W1 reaches the predetermined rotating speed W3 (S5, Yes), the actual rotating speed W1 is determined. It recovers to the target rotating speed W2 (S6).

When the actual rotating speed W1 does not reach the predetermined rotating speed W3 (S5, No), the controller device 60 decreases the actual rotating speed W1 toward the predetermined rotating speed W3 (S3).

When the traveling switching valve 34 has already been switched from the first state (first speed) to the second state (second speed) (when the process of S4 has already been performed), the process of S4 is skipped, the process proceeds to S5.

In addition, in the controller device 60, the process of reducing the actual rotating speed W1 toward the predetermined rotating speed W3 and the process of switching the traveling switching valve 34 may be individually processed in parallel.

In the embodiment described above, when the working machine 1 is accelerated from the first speed to the second speed, the prime mover rotating speed is reduced, but the working machine 1 is decelerated from the second speed to the first speed. In some cases, the motor speed may be reduced.

The controller device 60 switches the traveling switching valve 34 from the second state (second speed) to the first state (first speed), that is, when the rotating speed of the traveling motor is switched from the second speed to the first speed reduce the motor speed.

For example, when the working machine (machine body 2) is traveling as a traveling state at the time of deceleration, the controller device 60 reduces the prime mover rotating speed and the working machine (machine body 2) is stopped as the traveling state. In this case, the motor speed is not reduced.

Figure 2B:
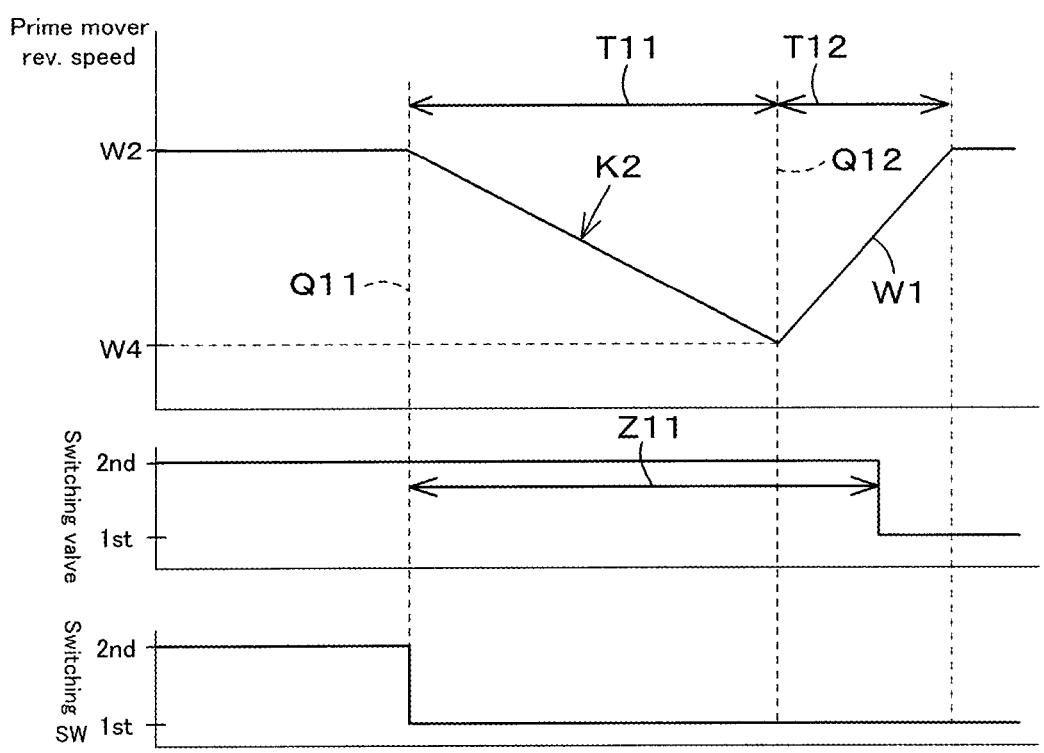
FIG. 2B is a view illustrating a relation between the revolving speed of the prime mover and the switching of the traveling motor under the state where the traveling motor is decelerated according to the first embodiment.

FIG. 2B is a diagram showing the relationship between the rotating speed (target rotating speed and actual rotating speed) of the prime mover when the traveling motor is decelerated from the second speed to the first speed and switching of the traveling motor.

As shown in FIG. 2B, in the controller device 60, the changeover switch (switch SW) 61 is operated at the time point Q11, and the controller device 60 changes from the second state (second speed) to the first state (first speed). It is supposed that a deceleration command (1st speed command) is acquired.

When the first speed command is acquired, the controller device 60 reduces the actual rotating speed W1 to a predetermined rotating speed W4 that is lower than the target rotating speed W2 set by the accelerator 65. The predetermined rotating speed W4 is a rotating speed that reduces a shift shock when the second speed is switched to the first speed, and is set by a decrease amount ΔD1 from the target rotating speed W2, for example.

The setting of the decrease amount ΔD1 is the same as that in the above-described embodiment, and the controller device 60 sets and sets the decrease amount ΔD1 corresponding to the traveling speed detected by the traveling detector device 67 when switching to deceleration. The prime mover rotating speed is reduced corresponding to the decrease amount ΔD1.

In addition, when reducing the motor speed, the controller device 60 keeps the slope K2 (the slope of the decrease time T11) that reduces the motor speed even when the decrease amount ΔD1 is different.

When actual rotating speed W1 reaches predetermined rotating speed W4 at time Q12, controller device 60 recovers actual rotating speed W1 to target rotating speed W2. Alternatively, the controller device 60 recovers the actual rotating speed W1 to the target rotating speed W2 during the decrease time T11 during which the actual rotating speed W1 is decreased to the predetermined rotating speed W4.

Here, the controller device 60 makes the recover time T12 for recovering the actual rotating speed W1 from the predetermined rotating speed W4 to the target rotating speed W2 shorter than the decrease time T11. That is, the controller device 60 makes the decrease speed at which the actual rotating speed W1 is reduced to the predetermined rotating speed W3 slower than the recover speed at which the actual rotating speed W1 is recovered from the predetermined rotating speed W3 to the target rotating speed W2.

In addition, the controller device 60 outputs a signal for demagnetizing the solenoid of the traveling switching valve 34 before recovering the actual rotating speed W1 from the predetermined rotating speed W4 to the target rotating speed W2, and the traveling switching valve (switching valve) 34 is switched from the second state (second speed) to the first state (first speed).

In other words, the controller device 60 recovers the actual rotating speed W1 to the target rotating speed W2 after switching the traveling switching valve 34 to the first state.

Figure 3B:
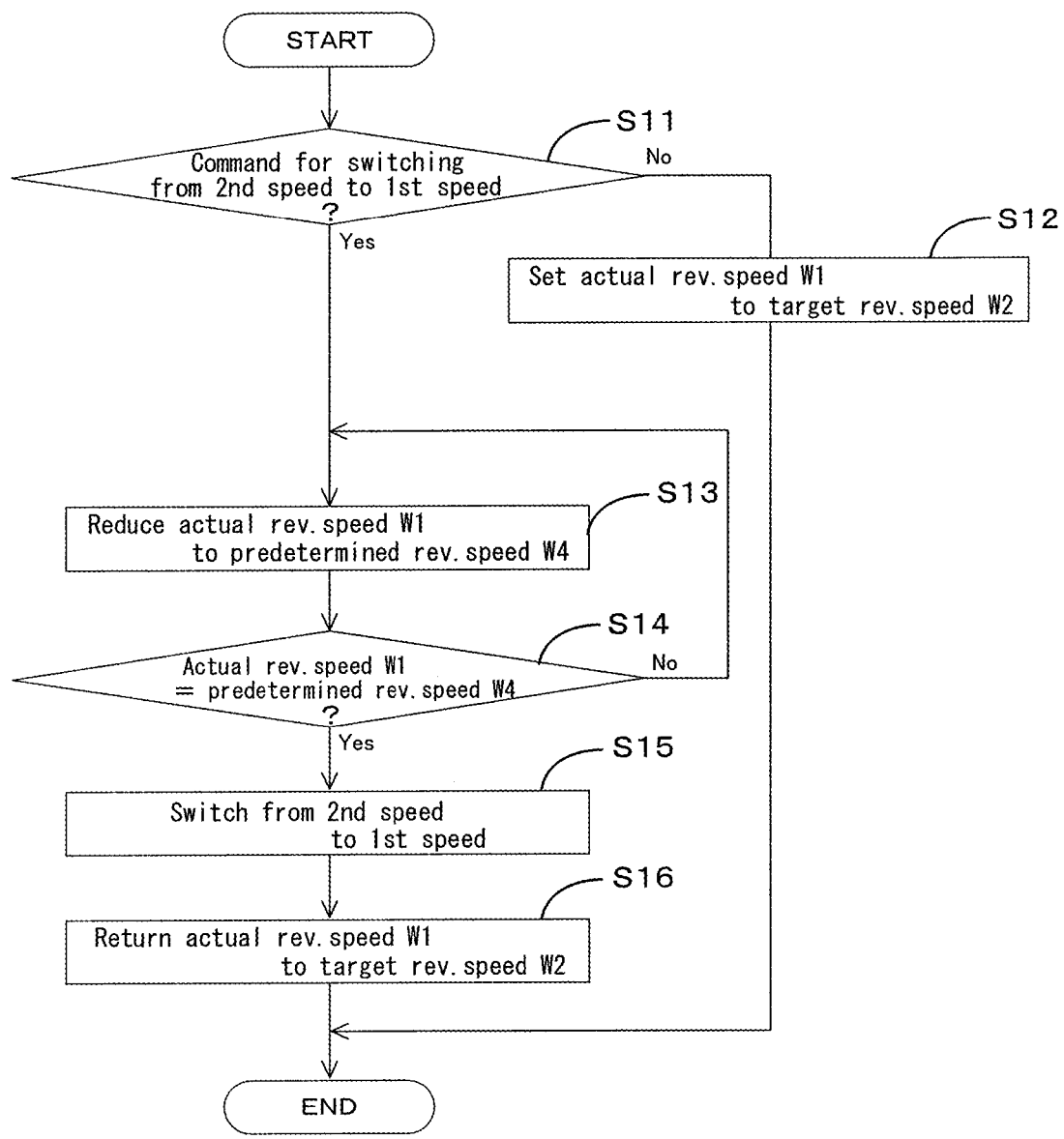
FIG. 3B is a view illustrating a second operation flow of the controller device under the state where the traveling motor is decelerated according to the first embodiment.

FIG. 3B is a diagram illustrating a control flow of the controller device 60 when the rotating speed of the traveling motor is changed from the second speed to the first speed. Note that the working machine is not in a stopped state but in a traveling state.

The controller device 60 determines whether or not the changeover switch 61 has been switched from the second speed to the first speed (S11).

When the changeover switch 61 is not switched to the first speed, that is, when the changeover switch 61 is maintained at the second speed (No in S11), the controller device 60 sets the actual rotating speed W1 to the target rotation based on the operation of the accelerator 65. The number W2 is set (S12).

When the changeover switch 61 is switched from the second speed to the first speed (S11, Yes), the controller device 60 reduces the actual rotating speed W1 to a predetermined rotating speed W4 lower than the target rotating speed W2 (S13).

The controller device 60 determines whether or not the actual rotating speed W1 has reached the predetermined rotating speed W4 (S14).

After the actual rotating speed W11 reaches the predetermined rotating speed W4 (S14, Yes), the controller device 60 switches the traveling switching valve 34 from the second state (second speed) to the first state (first speed) (S15).

The controller device 60 recovers the actual rotating speed W1 to the target rotating speed W2 (S16).

The working machine 1 includes a prime mover 32, traveling pumps (first traveling pump 53L, second traveling pump 53R), traveling motors (first traveling motor 36L, second traveling motor 36R), traveling switching valve 34, and controller device 60.

The controller device 60 reduces the motor speed based on the traveling state of the fuselage 2 when switching between the speed increasing from the first state to the second state and the speed switching from the second state to the first state.

According to this, when the speed of the working machine 1 is increased or decelerated, the prime mover rotating speed is reduced in accordance with the traveling state, so that the speed change shocks correspond to the traveling state.

The controller device 60 reduces the prime mover rotating speed when the machine body 2 is traveling as the traveling state, and does not decrease the prime mover rotating speed when the machine body 2 is stopped as the traveling state. According to this, it is possible to further reduce a shift shock when the machine body 2 is traveling.

The controller device 60 corresponds to the traveling speed detected by the traveling detector device 67 when switching to either the acceleration for switching from the first state to the second state or the deceleration for switching from the second state to the first state. The decrease amount ΔD1 of the prime mover rotating speed is set, and the prime mover rotating speed is reduced corresponding to the set decrease amount ΔD1.

According to this, when the speed of the working machine 1 is increased or decelerated, the motor speed is reduced according to the traveling speed, so that the traveling speed is in any state. Also, the shock of gear shifting can be reduced.

In addition, when the switching portion (changeover switch 61) issues a shift command, the controller device 60 reduces the prime mover rotating speed from the target rotating speed that is the prime mover rotating speed set by the accelerator 65, and then travels. The switching valve 34 is switched to either the first state or the second state according to the speed-shifting command.

According to this, since the prime mover rotating speed is reduced below the target rotating speed set by the accelerator 65 before the working machine 1 is accelerated or decelerated, the traveling pump is used at the time of either speed increase or deceleration. Thus, the flow rate of the operation fluid discharged from the engine can be temporarily reduced, whereby the shift shock can be reduced.

After switching the traveling switching valve 34, the controller device 60 recovers the prime mover rotating speed. According to this, after reducing the prime mover rotating speed in order to reduce the shift shock, the prime mover rotating speed can be brought into the state before deceleration as soon as possible.

The controller device 60 makes the recover time T2 for recovering the prime mover rotating speed longer than the decrease time T1 for reducing the prime mover rotating speed in the case of acceleration, and shortens the recover time T12 shorter than the decrease time T11 in the case of deceleration. According to this, after reducing the shift shock, it is possible to reduce the shift shock as much as possible in a situation where the engine speed is recovered as soon as possible before the shift.

Second Embodiment

Figure 6:
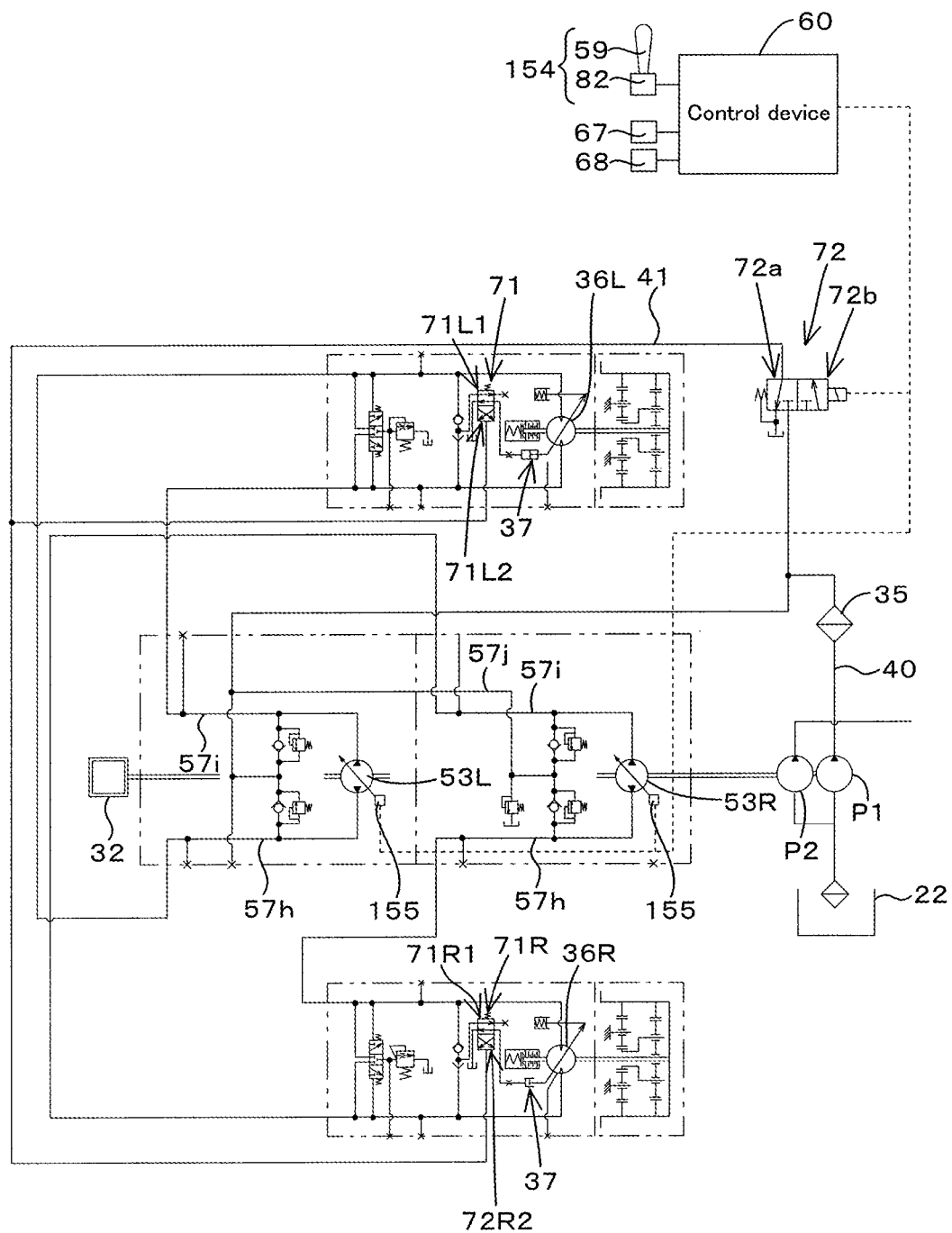
FIG. 6 is a view illustrating a hydraulic system (a hydraulic circuit) for a working machine according to a second embodiment of the present invention.

FIG. 6 shows a hydraulic system for a working machine in the second embodiment. In the second embodiment, not only the swash plate angle of the traveling pump (first traveling pump 53L, second traveling pump 53R) is changed by the operating device 154, but also the swash plate angle of the traveling pump is changed by the controller device 60.

FIG. 6 shows the traveling pump (first traveling pump 53L, second traveling pump 53R), operating device 154, and controller device 60, but the other portions are the same as in FIG. 1.

The operation device 154 is a joystick-type device that changes the swash plate angle of the traveling pump by electricity, and an operation detection device (sensor) that converts the operation amount of the operation lever 59 and the operation lever 59 into an electric signal. 82.

When the operation lever 59 is operated to the right, left, front, and rear, the operation amount and operation direction are detected by the operation detection device 82, and the detected operation amount and operation direction are input to the controller device 60.

The controller device 60 changes the swash plate angle of the traveling pump based on the operation amount and the operation direction detected by the operation detection device 82.

In particular, the traveling pumps (the first traveling pump 53L and the second traveling pump 53R) have a regulator 155 that changes the swash plate angle. Change the board angle. The traveling pumps (the first traveling pump 53L and the second traveling pump 53R) increase the flow rate of the discharged operation fluid as the swash plate angle increases, and decrease the flow rate of the discharged operation fluid as the swash plate angle decreases.

The controller device 60 is connected to an angle detection device 68 that detects a swash plate angle. By the angle detection device 68, the controller device 60 can grasp the actual swash plate angle (actual angle) of the traveling pump.

When the traveling switching valve 34 is switched from the first state to the second state (when the rotating speed of the traveling motor is increased from the first speed to the second speed), the controller device 60 performs the traveling pump (the first traveling pump 53L, the swash plate angle of the second traveling pump 53R) is reduced.

Figure 4A:
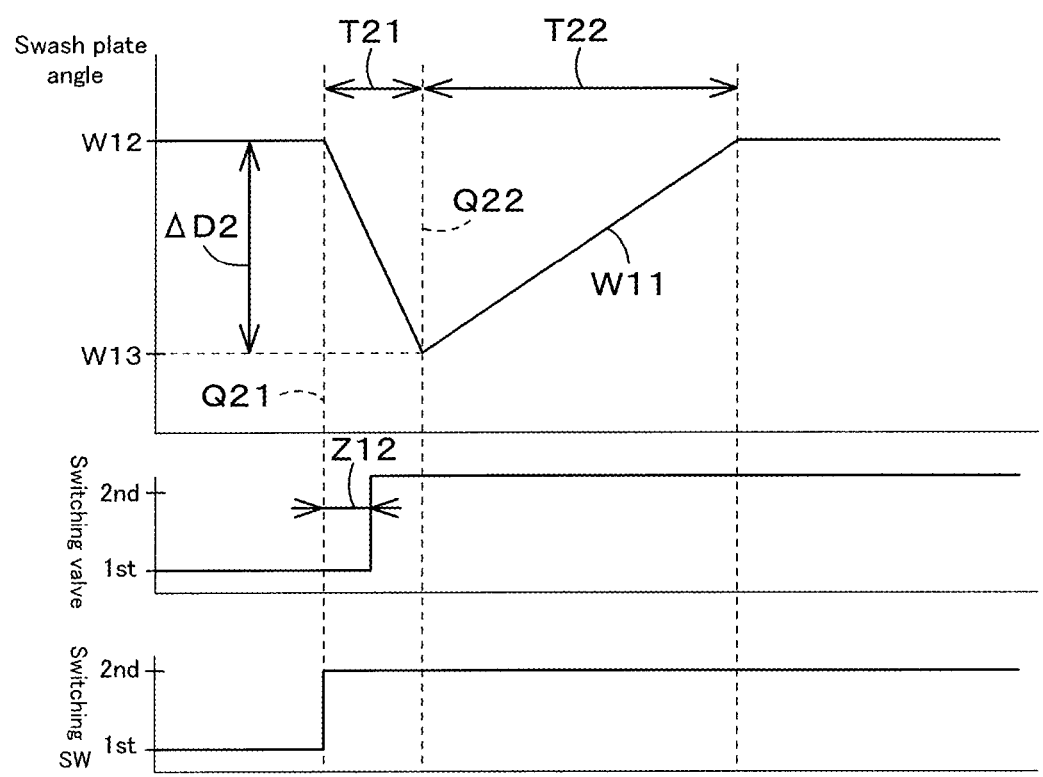
FIG. 4A is a view illustrating a relation between a swash-plate angle of a traveling pump and the switching of the traveling motor under the state where the traveling motor is accelerated according to the first embodiment.

FIG. 4A is a diagram showing a relationship between a swash plate angle (target angle and actual angle) when the traveling motor is accelerated from the first speed to the second speed and switching of the traveling motor.

As shown in FIG. 4A, the changeover switch (switching valve) 61 is operated at the time point Q21, and the controller device 60 commands the second state (second speed) from the first state (first speed) (second speed command).

When the controller device 60 obtains the second speed command, the actual angle W11 of the traveling pump (the first traveling pump 53L and the second traveling pump 53R) is set to the target swash plate angle set based on the operation amount of the operation device 154. The angle is lowered to a predetermined angle W13 lower than the angle (target angle) W12.

The predetermined angle W13 is an angle that reduces the shift shock when the first speed is switched to the second speed, and is a value obtained by subtracting the decrease amount ΔD2 from the actual angle W11.

Figure 9B:
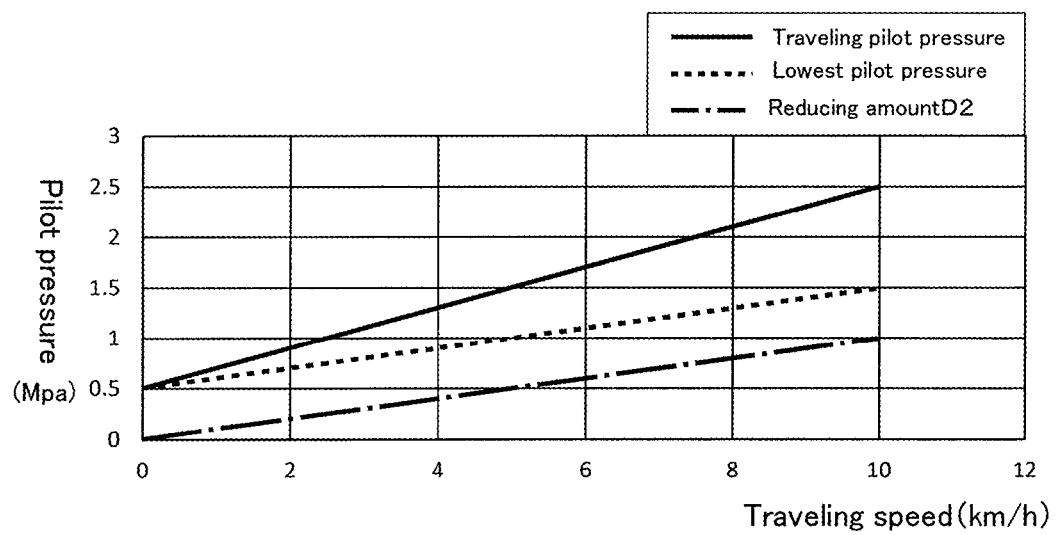
FIG. 9B is a view illustrating a graph of FIG. 9A.

As shown in FIG. 9A, the controller device 60 stores decrease amount calculation data indicating the relationship between the traveling pilot pressure and the amount of decrease in the traveling pilot pressure (decrease amount ΔD2). FIG. 9B is a graph of FIG. 9A. FIG. 9A and FIG. 9B is an example and is not limited.

In addition, the traveling speed (vehicle speed) shown in FIG. 9A is a value shown for convenience of explanation, and is a value at a predetermined motor speed, and is not limited.

FIG. 9A and FIG. 9B show the decrease amount of the traveling pilot pressure, the decrease amount of the traveling pilot pressure and the decrease amount ΔD2 of the swash plate angle are correlated. That is, since the swash plate angle is controlled by the traveling pilot pressure, the swash plate angle increases as the traveling pilot pressure increases, and the swash plate angle decreases as the traveling pilot pressure decreases.

For example, as shown in FIG. 9A, when the controller device 60 acquires the second speed command and the traveling speed is 5.0 km/h (traveling pilot pressure: 1.5 MPa), the amount of decrease in traveling pilot pressure is set to 0.50 MPa.

As shown in FIG. 9A, the controller device 60 has a lower limit value of the swash plate angle (the traveling pilot pressure) so that the swash plate angle does not become smaller, that is, so that the travel pilot pressure does not become smaller than the minimum pilot pressure when the revolving speed of the prime mover is decreased.

When actual angle W11 reaches a predetermined angle W13 at the time Q22, the controller device 60 recovers the actual angle W11 to the target angle W12. Alternatively, the controller device 60 recovers the actual angle W11 to the target angle W12 during the decrease time T21 for which the actual angle W11 is decreased to the predetermined angle W13.

Here, the controller device 60 makes the recover time T22 for recovering the actual angle W11 from the predetermined angle W13 to the target angle W12 longer than the decrease time T21.

That is, the controller device 60 makes the decrease speed for decreasing the actual angle W11 to the predetermined angle W13 higher than the recover speed for recovering the actual angle W11 from the predetermined angle W13 to the target angle W12.

In addition, the controller device 60 outputs a signal for magnetizing the solenoid of the traveling switching valve 34 at least for the decrease time T21, that is, before starting the control for recovering the actual angle W11 from the predetermined angle W13 to the target angle W12, and thereby the controller device 60 switches the traveling switching valve (switching valve) 34 from the first state (the first speed) to the second state (the second speed).

In other words, the controller device 60 recovers the actual angle W11 to the target angle W12 after switching the traveling switching valve 34 to the second state.

Figure 5A:
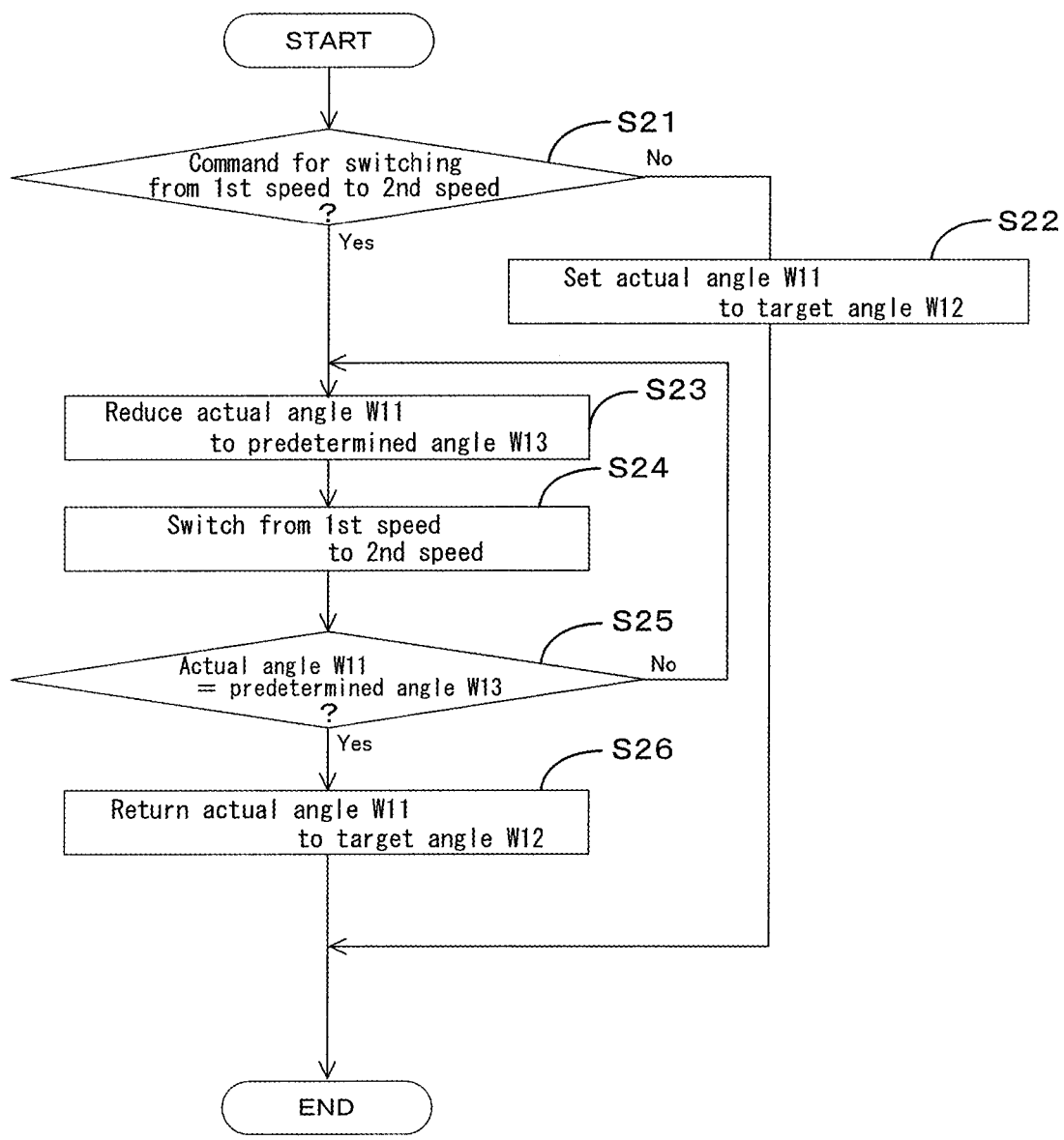
FIG. 5A is a view illustrating a third operation flow of the controller device under the state where the traveling motor is accelerated according to the first embodiment.

FIG. 5A is a view illustrating a control flow of the controller device 60 under the condition where the rotating speed of the traveling motor is changed from the first speed to the second speed according to the second embodiment. Note that the working machine is not under the stopping state but under the traveling state.

The controller device 60 judges whether or not the changeover switch 61 has been switched from the first speed to the second speed (step S21).

When the changeover switch 61 is not switched to the second speed, that is, when the changeover switch 61 is maintained at the first speed (step S21, No), the controller device 60 sets the actual angle W11 to the target angle W12 based on the operation of the operation device 154 (step S22).

When the changeover switch 61 is switched from the first speed to the second speed (step S1, Yes), the controller device 60 decreases the actual angle W11 toward the predetermined angle W13 that is lower than the target angle W12 (step S23).

The controller device 60 switches the traveling switching valve 34 from the first state (the first speed) to the second state (the second speed) before the actual angle W11 reaches the predetermined angle W13 (step S24).

The controller device 60 judges whether or not the actual angle W11 has reached the predetermined angle W13 (step S25). When the actual angle W11 has reached the predetermined angle W13 (step S25, Yes), the controller device 60 recovers the actual angle W11 to the target angle W12 (step S26).

In addition, when the actual angle W11 does not reach the predetermined angle W13 (step S25, No), the controller device 60 decreases the actual angle W11 toward the predetermined angle W13 (step S23).

When the traveling switching valve 34 has been already switched from the first state (the first speed) to the second state (the second speed) (when the step S24 has already been performed), the step S24 is skipped, and then the process proceeds to step S25.

In addition, in the controller device 60, the process of decreasing the actual angle W11 toward the predetermined angle W13 and the process of switching the traveling switching valve 34 may be individually processed in parallel.

The working machine 1 includes the prime mover 32, the traveling pumps (the first traveling pump 53L and the second traveling pump 53R), the traveling motors (the first traveling motor 36L and the second traveling motor 36R), the traveling switching valve 34, and the controller device 60. The controller device 60 reduces the swash plate angle of the traveling pump when switching from the first state to the second state.

According to that configuration, it is possible to reduce a shift shock in increasing the speed of the working machine 1 (in switching from the first state to the second state).

The working machine 1 includes the operation device 154 configured to change the swash plate angle of the traveling pump. When the controller device 60 receives a command to set the second state from the changeover switch 61, the controller device 60 decreases the swash plate angle of the traveling pump to be lower than the target angle that is a swash plate angle set by the operation device 154, and then switches the traveling switching valve 34 to the second state.

According to this configuration, the actual angle is decreased to be lower than the target angle set by the operating device 154 before the speed of the working machine 1 is increased, and thus the flow rate of the operation fluid to be outputted from the traveling pump can be temporarily decreased during the accelerating. In this manner, the shift shock can be reduced.

The controller device 60 recovers the swash plate angle of the traveling pump after switching the traveling switching valve 34 to the second state. According to this configuration, after the actual angle is lowered to reduce the shift shock, the actual angle can be brought into the state before the accelerating as soon as possible.

The controller device 60 makes the recover time T22 for recovering the swash plate angle longer than the decrease time T21 for decreasing the swash plate angle of the traveling pump. According to this configuration, after the shift shock is reduced, the shift shock in the accelerating can be made as small as possible under the situation where the actual angle is recovered to the angle before the accelerating as soon as possible.

The controller device 60 sets a decrease amount of the swash plate angle in accordance with the traveling speed detected by the traveling detector device. According to this configuration, it is possible to reduce the shift shock based on the traveling speed.

In the embodiment described above, the swash plate angle of the traveling pump is decreased in accelerating the working machine 1 from the first speed to the second speed. However, the swash plate angle may be decreased in decelerating the working machine 1 from the second speed to the first speed.

The controller device 60 controls the traveling pumps (the first traveling pump 53L and the first traveling pump 53) to reduce the swash plate angle in switching the traveling switching valve 34 from the second state to the first state (in decreasing the rotating speed of the traveling motor from the second speed to the first speed).

Figure 4B:
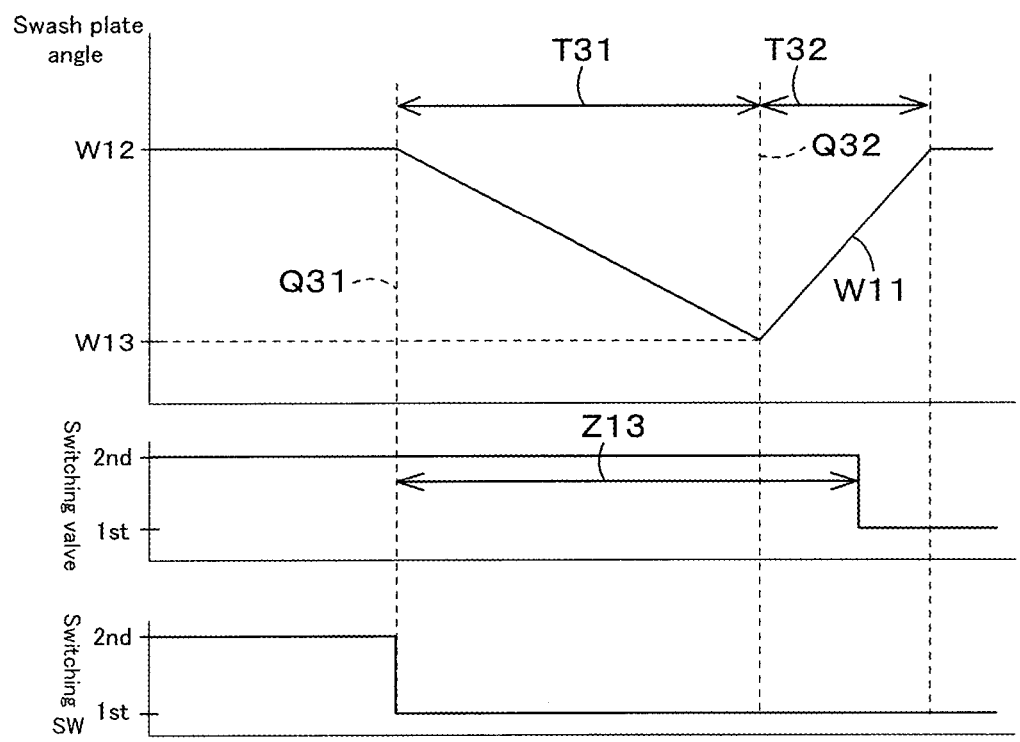
FIG. 4B is a view illustrating a relation between the swash-plate angle of the traveling pump and the switching of the traveling motor under the state where the traveling motor is decelerated according to the first embodiment.

FIG. 4B is a view showing a relation between the swash plate angle (the target angle and the actual angle) and the switching of the traveling motor in decelerating the traveling motor from the second speed to the first speed.

As shown in FIG. 4B, in the controller device 60, it is supposed that the changeover switch (a switch SW) 61 is operated at the time point Q31 and that the controller device 60 receives the command (the first speed command) to switch from the second state (the second speed) to the first state (the first speed).

When receiving the first speed command, the controller device 60 decreases the actual angle W11 of the traveling pump (the first traveling pump 53L and the second traveling pump 53R) to the predetermined angle W14 lower than the target angle W12 that is the swash plate angle set based on the operation amount of the operation device 154.

When actual angle W11 reaches the predetermined angle W14 at time point Q32, the controller device 60 recovers the actual angle W11 to the target angle W12. Alternatively, the controller device 60 recovers the actual angle W11 to the target angle W12 during the decrease time T31 for which the actual angle W11 is decreased to the predetermined angle W14. Here, the controller device 60 makes the recover time T32 for recovering the actual angle W11 from the predetermined angle W14 to the target angle W12 shorter than the decrease time T31.

That is, the controller device 60 makes the decrease speed for decreasing the actual angle W11 to the predetermined angle W14 lower than the recover speed for recovering the actual angle W11 from the predetermined angle W14 to the target angle W12.

In addition, the controller device 60 outputs a signal for demagnetizing the solenoid of the traveling switching valve 34 at least for the decrease time T31, that is, before starting the control for recovering the actual angle W11 from the predetermined angle W14 to the target angle W12, and thereby the controller device 60 switches the traveling switching valve 34 from the second state (the second speed) to the first state (the first speed).

In other words, the controller device 60 recovers the actual angle W11 to the target angle W12 after switching the traveling switching valve 34 to the first state.

Figure 5B:
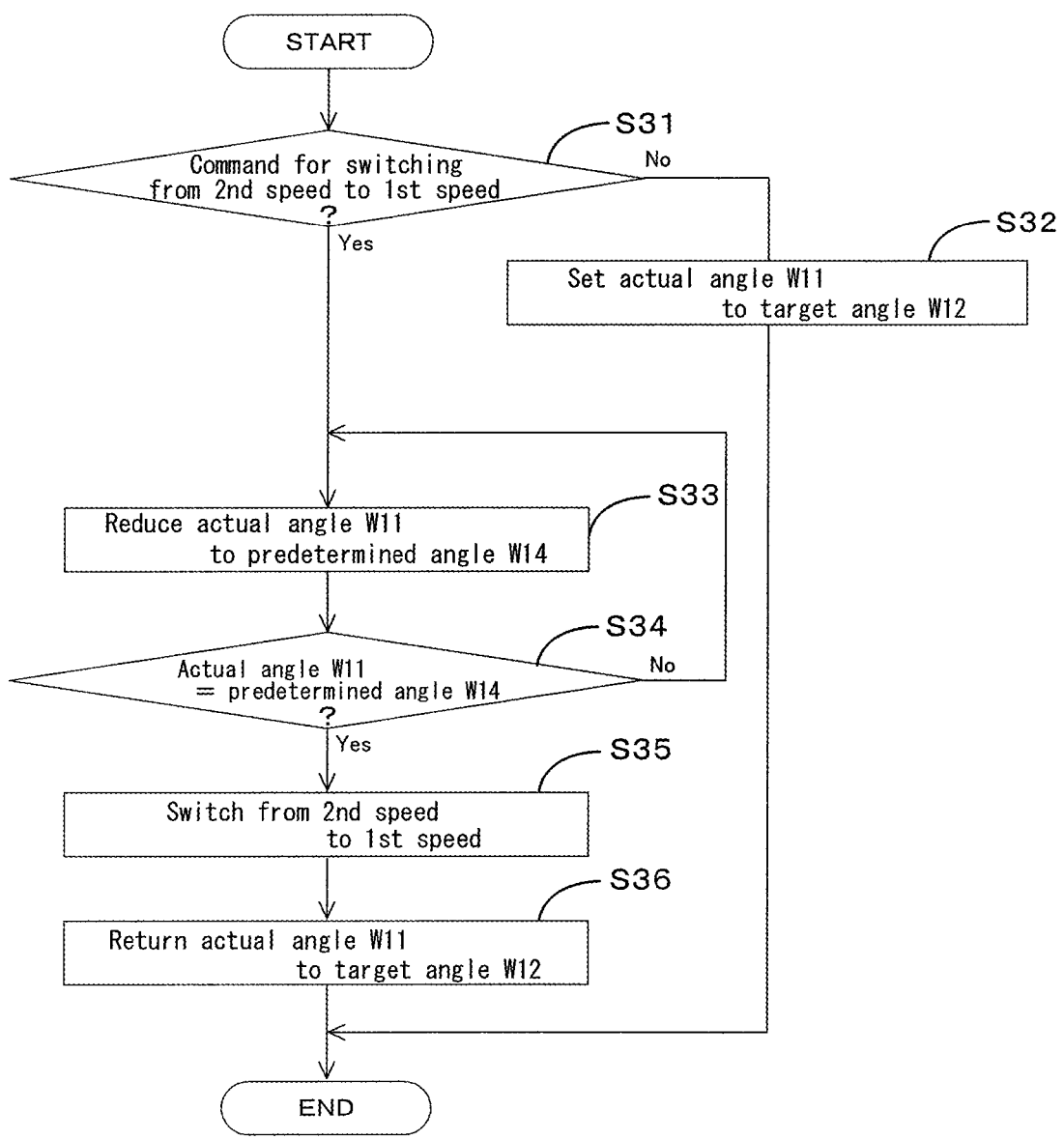
FIG. 5B is a view illustrating a fourth operation flow of the controller device under the state where the traveling motor is decelerated according to the first embodiment.

FIG. 5B is a view illustrating a control flow of the controller device 60 under the condition where the rotating speed of the traveling motor is changed from the second speed to the first speed according to the second embodiment. Note that the working machine is not under the stopping state but under the traveling state.

The controller device 60 judges whether or not the changeover switch 61 has been switched from the second speed to the first speed (step S31).

When the changeover switch 61 is not switched to the first speed, that is, when the changeover switch 61 is maintained at the second speed (step S31, No), the controller device 60 sets the actual angle W11 to the target angle W12 based on the operation of the operation device 154 (step S32).

When the changeover switch 61 is switched from the second speed to the first speed (step S31, Yes), the controller device 60 decreases the actual angle W11 toward the predetermined angle W14 that is lower than the target angle W12 (step S33).

The controller device 60 judges whether or not the actual angle W11 has reached the predetermined angle W14 (step S34).

After the actual angle W11 reaches the predetermined angle W14 (step S34, Yes), the controller device 60 switches the traveling switching valve 34 from the second state (the second speed) to the first state (the first speed) (step S35).

The controller device 60 recovers the actual angle W11 to the target angle W12 (step S36).

The working machine 1 includes the prime mover 4, the traveling pump (the first traveling pump 53L and the second traveling pump 53R), the traveling motor (the first traveling motor 36L and the second traveling motor 36R), the traveling switching valve 34, and the controller device 60. The controller device 60 decreases the swash plate angle of the traveling pump in switching from the second state to the first state.

According to this configuration, it is possible to reduce a shift shock in decreasing the speed of the working machine 1 (in switching from the second state to the first state).

When the controller device 60 receives a command to set the first state from the changeover switch 61, the controller device 60 decreases the swash plate angle of the traveling pump to be lower than the target angle that is a swash plate angle set by the operation device 154, and then switches the traveling switching valve 34 to the first state.

According to this configuration, the actual angle is decreased to be lower than the target angle set by the operating device 154 before the speed of the working machine 1 is decreased, and thus the flow rate of the operation fluid to be outputted from the traveling pump can be temporarily decreased during the decelerating. In this manner, the shift shock can be reduced.

The controller device 60 recovers the swash plate angle of the traveling pump at least after switching the traveling switching valve 34 to the first state. According to this configuration, after the actual angle is lowered to reduce the shift shock, the actual angle can be brought into the state before the decelerating as soon as possible.

The controller device 60 makes the recover time T32 for recovering the swash plate angle shorted than the decrease time T31 for decreasing the swash plate angle of the traveling pump. According to this configuration, after the shift shock is reduced, the shift shock in the decelerating can be made as small as possible under the situation where the actual angle is recovered to the angle before the decelerating as soon as possible.

In the case where the accelerating from the first speed to the second speed is performed in accordance with the changeover switch 61 and the decelerating from the second speed to the first speed is performed in accordance with the changeover switch 61, the controller 60 differs the switching time for switching the traveling switching valve 34 after the commend from the changeover switch 61 in the accelerating from the switching time in the decelerating.

In particular, as shown in FIG. 2A, the switching time from when the accelerating command is issued by the changeover switch 61 to when the traveling switching valve 34 is switched from the first state to the second state is represented by "Z10", and as shown in FIG. 2B, the switching time from when the decelerating command is issued by the changeover switch 61 to when the traveling switching valve 34 is switched from the second state to the first state is represented by "Z11", In that case, the switching time Z10 for the accelerating command is shorter than the switching time Z11 for the decelerating command (Z10<Z11).

In addition, as shown in FIG. 4A, the switching time from when the accelerating command is issued by the changeover switch 61 to when the traveling switching valve 34 is switched from the first state to the second state is represented by "Z12", and as shown in FIG. 4B, when the switching time from when the command is issued by the changeover switch 61 to when the traveling switching valve 34 is switched from the second state to the first state is represented by "Z13", the switching time Z12 is shorter than the switching time Z13 (Z12<Z13).

That is, the controller device 60 sets the switching times Z11, Z13 from the operating of the changeover switch 61 to the switching of the traveling switching valve 34 in the decelerating to be longer than the switching times Z10, Z12 from the operating of the changeover switch 61 to the switching of the traveling switching valve 34 in the accelerating.

In addition, in the embodiment described above, as shown in FIG. 2A and FIG. 2B, the revolving speed of the prime mover is reduced in the accelerating and in the decelerating, and the swash plate angle is decreased in the accelerating and in the decelerating as shown in FIG. 4A and FIG. 4B. However, a combination of the revolving speed of the prime mover and the swash plate angle may be employed.

For example, as shown in FIG. 2B, the controller device 60 decreases the rotating speed of the prime mover in the decelerating, while reducing the swash plate angle in the accelerating as shown in FIG. 4A.

In the embodiment described above, the controller device 60 makes the decrease amounts ΔD1 and D2 of the revolving speed of the prime mover variable depending on the traveling speed under the speed-shifting command. Here, when the slopes K1 and K2 of the decreasing in the revolving speed of the prime mover are constant, the time (decrease times T1, T11) from when the revolving speed of the prime mover starts decreasing to when the revolving speed reaches the predetermined speeds W3 and W4 is long. And, when the decrease amounts ΔD1 and D2 are small, the decrease times T1, T11 are long.

The controller device 60 sets switching times Z10, Z11, Z12, and Z13 depending on the lengths of the decrease times T1 and T11. When the decrease amounts ΔD1 and D2 are large and the decrease times T1 and T11 are long, the switching time Z10, Z11, Z12, and Z13 are set to be long. When decrease amounts ΔD1 and D2 are small and the decrease times T1 and T11 are short, the switching times Z10, Z11, Z12, and Z13 are set to be short.

That is, the controller device 60 sets the switching times Z10, Z11, Z12, and Z13 depending on the traveling speed under the speed-shifting command.

The controller device 60 differs the switching times Z10, Z11, Z12, and Z13 from when the speed-shifting command is received to when the traveling switching valve 34 is switched in the accelerating from the switching times in the decelerating.

According to this configuration, under the situation where the revolving speed of the prime mover is decreased to reduce the shift shock, it is easy to match a operator's feeling (a worker feeling) with the switching of the traveling switching valve 34 in the accelerating. In addition, it is easy to match the operator's feeling with the switching of the traveling switching valve 34 even in the decelerating, and thus the operation feeling can be improved.

The controller device 60 sets switching times Z10, Z11, Z12, and Z13 according to the traveling speed detected by the traveling detector device 67. According to this configuration, it is possible to change the timing of the speed-shifting according to the traveling speed, and thus it is possible to further reduce the shift shock.

The controller device 60 makes the switching times Z11 and Z13 in the decelerating longer than the switching times Z10 and Z12 in the accelerating. In this manner, the shift shock in the decelerating and the shift shock in the accelerating can be made substantially equivalent.

Figure 7:
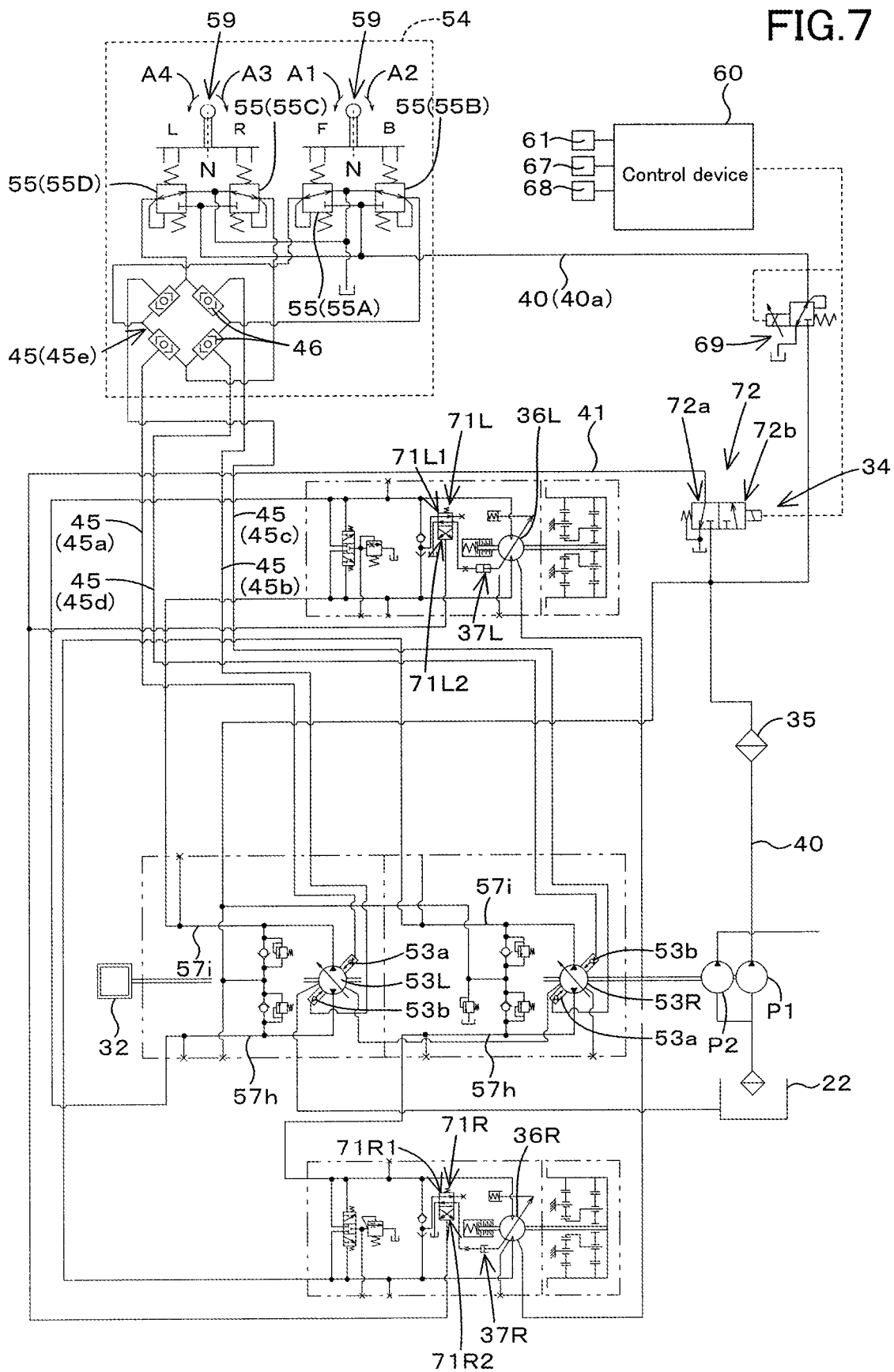
FIG. 7 is a view illustrating a modification example of the hydraulic system (the hydraulic circuit) for the working machine according to the second embodiment.

In the embodiment described above, the swash plate angle is changed by the regulator 155. However, the swash plate angle may be changed by other methods. For example, as shown in FIG. 7, the output fluid tube 40 is branched in the middle portion, and the proportional valve 69 is connected to a section 40a that is the output fluid tube 40 after branching and reaches the operation device 54. The proportional valve 69 is an electromagnetic proportional valve configured to change the opening aperture under the control by the controller device 60.

Under a situation where the operation lever 59 of the operation device 54 is fully stroked, that is, a situation where the operation valve 55 (55A, 55B, 55C, 55D) is substantially fully open, the controller device 60 decreases the opening aperture of the proportional valve 69 to be smaller than the opening aperture defied in the operating of the changeover switch 61 when receiving the command issued by the changeover switch 61 to switch from the first speed to the second speed. In this manner, the primary pressure of the operation fluid flowing toward the operation valve 55 is reduced, and the swash plate angle of the traveling pumps (the first traveling pump 53L and the second traveling pump 53R) is decreased to be smaller than the current angle, as in FIG. 4A.

After the swash plate angle of the traveling pumps (the first traveling pump 53L and the second traveling pump 53R) decreases, the controller device 60 switches the traveling switching valve 34 to the second state, and after switching to the second state, the opening aperture of the proportional valve 69 is recovered.

In addition, under a situation where the operation lever 59 of the operation device 54 is fully stroked, the opening aperture of the proportional valve 69 is decreased to be smaller than the opening aperture defined in the operating of the changeover switch 61 when the controller device 60 receives a command issued by the changeover switch 61 to switch from the second speed to the first speed. In this manner, the primary pressure of the operation fluid flowing toward the operation valve 55 is reduced, and the swash plate angle of the traveling pumps (the first traveling pump 53L and the second traveling pump 53R) is decreased to be smaller than the current angle, as in FIG. 4B.

After the swash plate angles of the traveling pumps (the first traveling pump 53L and the second traveling pump 53R) are reduced, the controller device 60 switches the traveling switching valve 34 to the first state, and after switching to the first state, the opening aperture of the proportional valve 69 is recovered.

It can be known whether or not the operation lever 59 is fully stroked, based on the operation amount (operation extent) detected by the operation detection device (a sensor) 82.

That is, as shown in FIG. 7, the swash plate angle of the traveling pump (the first traveling pump 53L and the second traveling pump 53R) can also be decreased in the accelerating or in the decelerating by the proportional valve 69 provided in the output fluid tube 40 (40a).

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

In the embodiment described above, the switching portion is constituted of the changeover switch 61 configured to be manually operated by the operator or the like, but may be incorporated in the controller device 60. When incorporated in the controller device 60, the switching portion is constituted of a computer program, an electric component, or an electronic component (an electronic/electronic circuit) stored in the controller device 60.

In that case, the switching portion of the controller device 60 judges whether to switch between the first speed state and the second speed state based on the detected data from various detection devices such as a sensor provided on the working device, and outputs a control signal to the traveling switching valve 34 based on the judgment result.

The traveling switching valve 34 switches to the first speed state when receiving the control signal for the first speed state, and switches to the second speed state when receiving the control signal for the second speed state.

The traveling switching valve 34 is a valve configured to be switched between a first state to set the traveling motors (the first traveling motor 36L and the second traveling motor 36R) to the first speed and a second state to set the traveling motor to the second state, and the traveling switching valve 34 may be the proportional valve other than the direction switching valve.

The traveling motor may be a motor having a neutral position between the first speed and the second speed.

The traveling motor (the first traveling motor 36L and the second traveling motor 36R) may be constituted of an axial piston motor or a radial piston motor. When the traveling motor is constituted of the radial piston motor, the motor displacement is increased to switch to the first speed, and the motor displacement is decreased to switch to the second speed.

Since the traveling speed changes depending on the operation of the travel lever 59, the traveling detector device 67 may be a device configured to detect the traveling speed based on the operation amount (the operation angle) and the operation position of the operation lever 59. As described above, since the second speed (the second state) only needs to be higher than the first speed (the first state), the shifting steps of the working machine is not limited to two speeds, and may employ multiple speeds (a plurality of speeds).

A working machine according to the embodiments mentioned above, includes: a prime mover; a traveling pump to be driven by the prime mover to output operation fluid; a traveling motor to be driven by the operation fluid outputted from the traveling pump and to change a motor speed between a first speed and a second speed higher than the first speed; a machine body on which the prime mover, the traveling pump, and the traveling motor are arranged; a traveling switching valve to be switched between: a first state allowing the traveling motor to rotate at the first speed; and a second state allowing the traveling motor to rotate at the second speed; and a controller to reduce a revolving speed of the prime mover based on a traveling condition of the machine body in switching the traveling switching valve between: an accelerating state to switch the traveling switching valve from the first state to the second state; and a decelerating state to switch the traveling switching valve from the second state to the first state.

The controller decreases the revolving speed of the prime mover when the traveling condition represents that the machine body travels, and does not decrease the revolving speed of the prime mover when the traveling condition represents that the machine body stops.

The working machine mentioned above includes a traveling detector to detect a traveling speed of the machine body as the traveling condition. The controller sets a decrease amount of the revolving speed of the prime mover corresponding to the traveling speed detected by the traveling detector when switching the traveling switching valve to either the accelerating state or the decelerating state, and reduces the revolving speed of the prime mover based on the set decrease amount.

The working machine mentioned above includes: a switch to output a speed-shifting signal representing either the accelerating state or the decelerating state; and an accelerator to set the revolving speed of the prime mover. The controller reduces the revolving speed of the prime mover to be lower than a target revolving speed when the switch outputs the speed-shifting signal, the target revolving speed being the revolving speed of the prime mover set by the accelerator, and then switches the traveling switching valve to either the first state or the second state in accordance with the speed-shifting signal.

The controller recovers the revolving speed of the prime mover after switching the traveling switching valve.

The controller sets a recovery time taken for recovering the revolving speed of the prime mover to be longer than a decrease time taken for reducing the revolving speed of the prime mover when the traveling switching valve is in the accelerating state, and sets the recovery time to be shorted than the reduction time when the traveling switching valve is in the decelerating state.

The working machine mentioned above includes: a first traveling device arranged to a left side of the machine body; and a second traveling device arranged to a right side of the machine body. The traveling motor includes: a first traveling motor to provide power to the first traveling device; and a second traveling motor to provide power to the second traveling device. The traveling pump is configured to drive the first traveling motor and the second traveling motor. The traveling switching valve is configured to switch the first traveling motor and the second traveling motor between the first speed and the second speed.

The switch is a changeover switch to output the speed-shifting signal to the controller.

A working machine according to the embodiments mentioned above, includes: a prime mover; a traveling pump to be driven by the prime mover to output operation fluid; a traveling motor to be driven by the operation fluid outputted by the traveling pump and to switch a motor speed between a first speed and a second speed higher than the first speed; a traveling switching valve to be switched between: a first state allowing the traveling motor to rotate at the first speed; and a second state allowing the traveling motor to rotate at the second speed; a switch to output a speed-shifting signal to switch the traveling switching valve between: an accelerating state to switch the traveling switching valve from the first state to the second state; and a decelerating state to switch the traveling switching valve from the second state to the first state; and a controller to switch the traveling switching valve and to differ a switching time under the accelerating state from the switching time under the decelerating state, the switching time being required for switching the traveling switching valve after obtaining the speed-shifting signal from the switch.

The working machine mentioned above includes: a machine body including the prime mover, the traveling pump, and the traveling motor; and a traveling detector device to detect a traveling speed of the machine body. The controller sets the switching time depending on the traveling speed detected by the traveling detector device.

The controller sets the switching time under the decelerating state to be longer than the switching time under the accelerating state.

The working machine mentioned above includes an accelerator to set a revolving speed of the prime mover. The controller reduces the revolving speed of the prime mover to be lower than a target revolving speed when the switch outputs the speed-shifting signal, the target revolving speed being the revolving speed of the prime mover set by the accelerator, and then switches the traveling switching valve to either the first state or the second state in accordance with the speed-shifting signal.

The controller recovers the revolving speed of the prime mover after switching the traveling switching valve.

The controller sets, under the accelerating state, a recovery time for recovering the revolving speed of the prime mover to be longer than a decreasing time for decreasing the revolving speed, and sets, under the decelerating state, the recovery time to be shorter than the decreasing time.

The working machine mentioned above includes: a first traveling device arranged to a left side of the machine body; and a second traveling device arranged to a right side of the machine body. The traveling motor includes: a first traveling motor to provide power to the first traveling device; and a second traveling motor to provide power to the second traveling device. The traveling pump is configured to drive the first traveling motor and the second traveling motor. The traveling switching valve is configured to switch the first traveling motor and the second traveling motor between the first speed and the second speed.

The switch is a changeover switch to output the speed-shifting signal to the controller.

What is claimed is:

1. A working machine, comprising:
   a prime mover;
   a traveling pump configured to be driven by the prime mover to output operation fluid;
   a traveling motor configured to be driven by the operation fluid outputted from the traveling pump and to change a motor speed between a first speed and a second speed higher than the first speed;
   a machine body on which the prime mover, the traveling pump, and the traveling motor are arranged;
   a traveling switching valve configured to be switched between a first state allowing the traveling motor to rotate at the first speed and a second state allowing the traveling motor to rotate at the second speed; and
   a controller configured or programmed to reduce a revolving speed of the prime mover based on a traveling condition of the machine body when performing an accelerating process to switch the traveling switching valve from the first state to the second state or a decelerating process to switch the traveling switching valve from the second state to the first state.

2. The working machine according to claim 1, wherein
   the controller executes the reduction of the revolving speed of the prime mover when the traveling condition represents that the machine body travels, and
   the controller does not execute the reduction of the revolving speed of the prime mover when the traveling condition represents that the machine body stops.

3. The working machine according to claim 1, further comprising:
   a traveling detector to detect a traveling speed of the machine body as the traveling condition, wherein
   the controller, when performing either the accelerating process or the decelerating process, determines a reduction amount of the revolving speed of the prime mover corresponding to the traveling speed detected by the traveling detector, and reduces the revolving speed of the prime mover based on the determined reduction amount.

4. The working machine according to claim 2, further comprising:
   a traveling detector to detect a traveling speed of the machine body as the traveling condition, wherein
   the controller, when performing either the accelerating process or the decelerating process, determines a reduction amount of the revolving speed of the prime mover corresponding to the traveling speed detected by the traveling detector, and reduces the revolving speed of the prime mover based on the determined reduction amount.

5. The working machine according to claim 3, further comprising:
   a switch operable to output a speed-shifting signal representing either the accelerating process or the decelerating process; and
   an accelerator to set the revolving speed of the prime mover as a target revolving speed, wherein
   when the switch is operated to output the speed-shifting signal, the controller reduces the revolving speed of the prime mover to be lower than the target revolving speed, and then switches the traveling switching valve to either the first state or the second state in accordance with the speed-shifting signal.

6. The working machine according to claim 4, further comprising:
   a switch configured to output a speed-shifting signal representing either the accelerating process or the decelerating process; and
   an accelerator to set the revolving speed of the prime mover as a target revolving speed, wherein
   when the switch outputs the speed-shifting signal, the controller reduces the revolving speed of the prime mover to be lower than the target revolving speed, and then switches the traveling switching valve to either the first state or the second state in accordance with the speed-shifting signal.

7. The working machine according to claim 5, wherein, after the traveling switching valve is switched, the controller recovers the revolving speed of the prime mover to the revolving speed before the switching of the traveling switching valve.

8. The working machine according to claim 7, wherein
   the controller, when performing the accelerating process, determines a recovery time taken for recovering the revolving speed of the prime mover to be longer than a reduction time taken for reducing the revolving speed of the prime mover, and
   the controller, when performing the decelerating process, determines the recovery time to be shorter than the reduction time.

9. The working machine according to claim 3, further comprising:
   a first traveling device arranged on a left portion of the machine body; and a second traveling device arranged on a right portion of the machine body, wherein
the traveling motor includes
a first traveling motor to supply power to the first traveling device, and
a second traveling motor to supply power to the second traveling device,
the traveling pump is configured to drive the first traveling motor and the second traveling motor, and
the traveling switching valve is configured to switch the motor speed of each of the first traveling motor and the second traveling motor between the first speed and the second speed.

10. The working machine according to claim 3, wherein the switch is a changeover switch configured to output the speed-shifting signal to the controller.

11. A working machine, comprising:
a prime mover;
a traveling pump configured to be driven by the prime mover to output operation fluid;
a traveling motor configured to be driven by the operation fluid outputted by the traveling pump and to switch a motor speed between a first speed and a second speed higher than the first speed;
a traveling switching valve configured to be switched between a first state allowing the traveling motor to rotate at the first speed and a second state allowing the traveling motor to rotate at the second speed;
a switch configured to output a speed-shifting signal representing either an accelerating process to switch the traveling switching valve from the first state to the second state or a decelerating process to switch the traveling switching valve from the second state to the first state; and
a controller configured or programmed to switch the traveling switching valve and to set a switching time required for switching the traveling switching valve after obtaining the speed-shifting signal from the switch, the switching time being different depending on whether to perform the accelerating process or the decelerating process.

12. The working machine according to claim 11, further comprising:
a machine body on which the prime mover, the traveling pump, and the traveling motor are provided; and
a traveling detector configured to detect a traveling speed of the machine body, wherein
the controller sets the switching time in correspondence to the traveling speed detected by the traveling detector.

13. The working machine according to claim 11, wherein the controller sets the switching time for the decelerating process to be longer than the switching time for the accelerating process.

14. The working machine according to claim 12, wherein the controller sets the switching time for the decelerating process to be longer than the switching time for the accelerating process.

15. The working machine according to claim 11, further comprising:
an accelerator to set a revolving speed of the prime mover as a target revolving speed, wherein
when the switch outputs the speed-shifting signal, the controller reduces the revolving speed of the prime mover to be lower than the target revolving speed, and then switches the traveling switching valve to either the first state or the second state in accordance with the speed-shifting signal.

16. The working machine according to claim 12, further comprising:
an accelerator to set a revolving speed of the prime mover as a target revolving speed, wherein
when the switch outputs the speed-shifting signal, the controller reduces the revolving speed of the prime mover to be lower than the target revolving speed, and then switches the traveling switching valve to either the first state or the second state in accordance with the speed-shifting signal.

17. The working machine according to claim 12, wherein, after the traveling switching valve is switched, the controller recovers the revolving speed of the prime mover to the revolving speed before the switching of the traveling switching valve.

18. The working machine according to claim 17, wherein
the controller, when performing the accelerating process, determines a recovery time taken for recovering the revolving speed of the prime mover to be longer than a reduction time for reducing the revolving speed, and
the controller, when performing the decelerating process, determines the recovery time to be shorter than the reduction time.

19. The working machine according to claim 12, further comprising:
a first traveling device arranged on a left portion of the machine body; and
a second traveling device arranged on a right portion of the machine body, wherein
the traveling motor includes
a first traveling motor to supply power to the first traveling device, and
a second traveling motor to supply power to the second traveling device,
wherein
the traveling pump is configured to drive the first traveling motor and the second traveling motor, and
the traveling switching valve is configured to switch the motor speed of each of the first traveling motor and the second traveling motor between the first speed and the second speed.

20. The working machine according to claim 11, wherein the switch is a changeover switch configured to output the speed-shifting signal to the controller.

* * * * *